(12) United States Patent
Suzuki et al.

(10) Patent No.: US 10,243,497 B2
(45) Date of Patent: Mar. 26, 2019

(54) MOTOR CONTROL APPARATUS AND ELECTRONIC POWER STEERING SYSTEM

(71) Applicant: DENSO CORPORATION, Kariya, Aichi-pref. (JP)

(72) Inventors: Haruo Suzuki, Kariya (JP); Hiroyasu Otake, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/716,231

(22) Filed: Sep. 26, 2017

(65) Prior Publication Data

US 2018/0091081 A1  Mar. 29, 2018

(30) Foreign Application Priority Data

Sep. 29, 2016 (JP) .................. 2016-191375

(51) Int. Cl.
*H02P 21/22* (2016.01)
*H02P 6/28* (2016.01)
*H02P 29/68* (2016.01)
*H02P 6/08* (2016.01)

(52) U.S. Cl.
CPC .............. *H02P 21/22* (2016.02); *H02P 6/085* (2013.01); *H02P 6/28* (2016.02); *H02P 29/68* (2016.02)

(58) Field of Classification Search
CPC .. H02P 21/22; H02P 6/28; H02P 6/085; H02P 29/68
USPC ..................... 318/400.02, 727, 432, 434, 801
See application file for complete search history.

(56) References Cited

U.S. PATENT DOCUMENTS

| | | | |
|---|---|---|---|
| 6,320,349 B1* | 11/2001 | Kaneko ................. | B60L 15/025 318/700 |
| 7,960,927 B2* | 6/2011 | Chen .................... | H02P 21/0089 318/400.07 |
| 8,164,292 B2* | 4/2012 | Park ........................ | H02P 23/26 318/400.26 |
| 2008/0047776 A1 | 2/2008 | Kobayashi et al. | |
| 2009/0079375 A1 | 3/2009 | Suzuki | |

(Continued)

FOREIGN PATENT DOCUMENTS

| JP | 2008-179247 | 8/2008 |
|---|---|---|
| JP | 2012-076693 | 4/2012 |

(Continued)

*Primary Examiner* — Rina I Duda
(74) *Attorney, Agent, or Firm* — Knobbe, Martens, Olson & Bear, LLP

(57) ABSTRACT

In an apparatus, a motor current limit calculator calculates a motor current limit to which a motor current is to be limited. A motor current command calculator calculates a motor current command representing a target value for the motor current. A current command corrector corrects the motor current command as a function of the motor current limit. A motor voltage command calculator calculates a motor voltage command as a function of the corrected motor current command and the motor current, and feed back the motor voltage command to the motor current limit calculator. The motor voltage command represents a target value for a voltage of the output power applied to the motor. The motor current limit calculator calculates the motor current limit in accordance with the motor current, the converter current limit, and the motor voltage command fed back from the motor voltage command calculator.

9 Claims, 10 Drawing Sheets

(56) References Cited

U.S. PATENT DOCUMENTS

| 2012/0139460 A1* | 6/2012 | Senkou | H02P 21/50 |
| | | | 318/400.02 |
| 2015/0123577 A1* | 5/2015 | Omata | B60L 3/0061 |
| | | | 318/400.02 |
| 2016/0185384 A1 | 6/2016 | Kodera | |

FOREIGN PATENT DOCUMENTS

| JP | 5109554 B2 | 12/2012 |
| JP | 2016-113111 | 6/2016 |

* cited by examiner

MOTOR CONTROL APPARATUS AND ELECTRONIC POWER STEERING SYSTEM

CROSS REFERENCE TO RELATED APPLICATIONS

This application is based on and claims the benefit of priority from Japanese Patent Application 2016-191375 filed Sep. 29, 2016, the disclosure of which is incorporated in its entirety herein by reference.

TECHNICAL FIELD

The present disclosure relates to motor control apparatuses and electric power steering systems each equipped with such a motor control apparatus.

BACKGROUND

Apparatuses for controlling a motor installed in an electrical actuator system, such as an electric power steering system, usually have a function of avoiding an overcurrent from being supplied to the motor.

For example, Japanese Patent Publication No. 5109554, referred to as a published patent document, discloses a motor control apparatus installed in a motor system in which a voltage from a power source is supplied to a motor via an inverter. The motor control apparatus is configured to limit, based on the voltage from the power source and the rotational angular velocity of the motor, a current, which is supplied from the power source to flow through the inverter as an inverter current, to be equal to or lower than a predetermined allowable upper limit.

SUMMARY

A change in a resistance component, such as a resistance in wires between the power source to the motor control apparatus, in a torque constant and/or in a back-emf (electromotive force) constant, which are parameters representing the characteristics of the motor, may cause the inverter current to exceed the allowable upper limit. From this viewpoint, the motor control apparatus may excessively limit the inverter current, resulting in a reduction of the output of the motor.

In view of these circumstances, a first aspect of the present disclosure seeks to provide motor control apparatuses, each of which is capable of stably limiting a current supplied from a power supply to an inverter without the limited current exceeding an allowable upper limit.

Specifically, a second aspect of the present disclosure seeks to provide electric power steering systems, each of which is equipped with a motor control apparatus according to the first aspect.

According to a first exemplary aspect of the present disclosure, there is provided an apparatus for controlling a motor. The apparatus includes a power converter configured to convert input power from a power supply to output power, and apply the output power to the motor. The apparatus includes a motor current detector configured to detect, as a motor current, a current flowing in the motor, and a converter current limit calculator configured to calculate a converter current limit to which a current flowing in the power converter is limited. The current flowing in the power converter is referred to as a converter current. The apparatus includes a motor current limit calculator configured to calculate a motor current limit to which the motor current is limited, and a motor current command calculator configured to calculate a motor current command representing a target value for the motor current. The apparatus includes a current command corrector configured to correct the motor current command as a function of the motor current limit, and a motor voltage command calculator. The motor voltage command calculator is configured to calculate a motor voltage command as a function of the corrected motor current command and the motor current, and feed back the motor voltage command to the motor current limit calculator. The motor voltage command represents a target value for a voltage of the output power applied to the motor. The motor current limit calculator is configured to calculate the motor current limit in accordance with the motor current, the converter current limit, and the motor voltage command fed back from the motor voltage command calculator.

According to a second exemplary aspect of the present disclosure, there is provided an electric power steering system. The electric power steering system includes a motor configured to output assist torque for assisting a driver's turning operation of a steering member of a vehicle, and an apparatus for controlling the motor according to the first exemplary aspect of the present disclosure.

The motor control apparatus according to each of the first and second exemplary aspects is configured to calculate the motor voltage command as a function of the corrected motor current command and the motor current, and feed back the motor voltage command to the motor current limit calculator; the motor voltage command represents the target value for the voltage of the output power applied to the motor.

That is, this configuration calculates the motor voltage command as a function of the corrected motor current command and the motor current while factoring in a change of a voltage of the input power due to a change in an interconnection resistance between the power supply and the power converter, and/or a change of the motor current due to a change in a torque constant, and/or in a back-emf constant of the motor.

This configuration therefore enables a change in at least one of the interconnection resistance and a change in the torque constant and/or in the back-emf constant of the motor to be reflected in the motor voltage command. This makes it possible to stably control the converter current even in a case of a change in the interconnection resistance, in the torque constant of the motor, and/or in the hack-emf constant of the motor without sacrificing the output of the motor.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
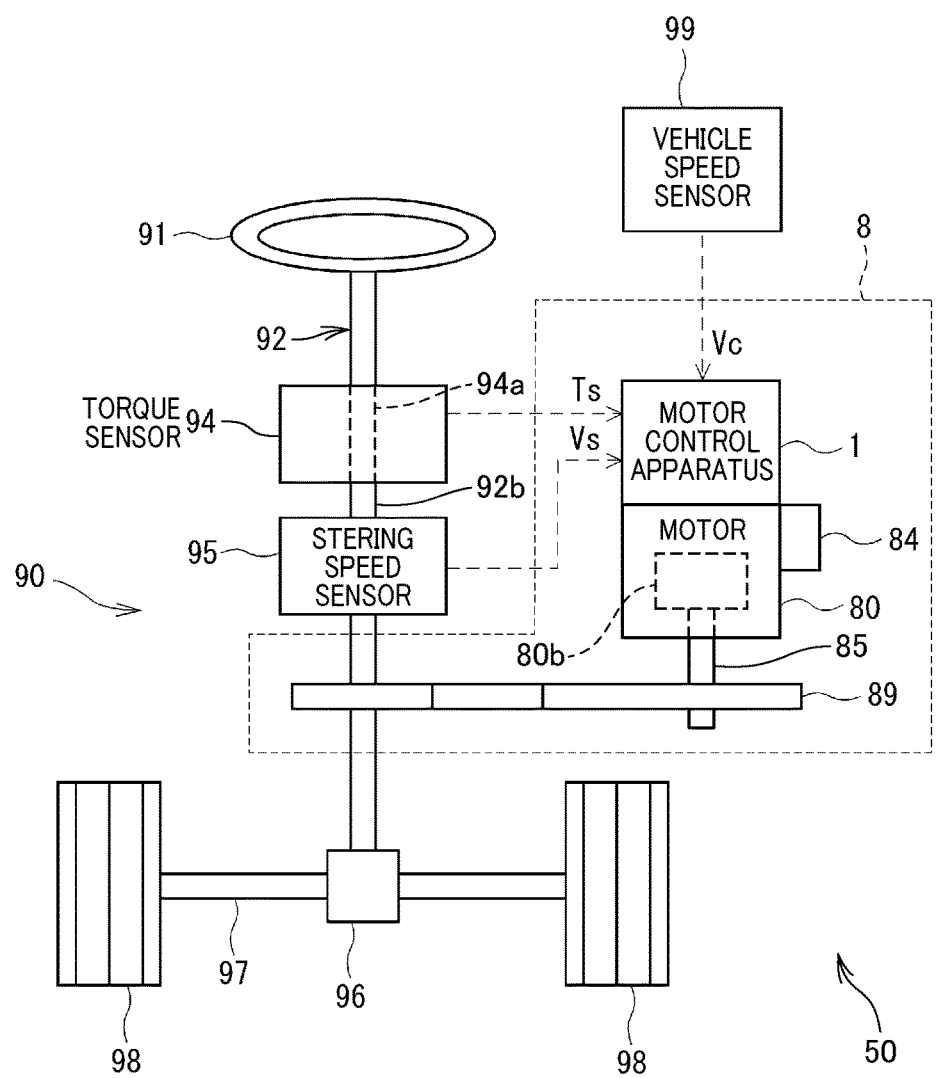
FIG. 1 is a structural diagram schematically illustrating an electric power steering system according to the first embodiment of the present disclosure.

The following describes embodiments of the present disclosure with reference to the accompanying drawings. In the embodiments, like parts between the embodiments, to which like reference characters are assigned, are omitted or simplified to avoid redundant description.

First, the following describes a common configuration of motor control apparatuses 1, 2, and 3 according to the respective first, second, and third embodiments.

Common Configuration

First, the following describes an electric power steering system 8 in which each of the motor control apparatuses 1, 2, and 3 is installed. FIG. 1 illustrates the electric power steering system 8 in which the motor control apparatus 1 according to the first embodiment is installed as a typical example. That is, in the electric power steering system 8 according to the second embodiment, the motor control apparatus 2 according to the second embodiment is installed, or, in the electric power steering system 8 according to the third embodiment, the motor control apparatus 3 according to the second embodiment is installed.

Referring to FIG. 1, the electric power steering system 8 is installed in, for example, a steering system 90; the steering system 90 is installed in a vehicle 50. The electric power steering system 8 is operative to assist a driver's steering operation of a steering wheel 91 of the vehicle 50.

The steering system 90 includes, for example, the steering wheel 91 as a driver's operation member, a steering shaft 92, a torque sensor 94, a steering speed sensor 95, a pinion gear 96, a rack and axle 97, wheels 98, a vehicle speed sensor 99, and the electric power steering system 8.

The steering shaft 92 is comprised of, for example, a first portion, i.e. an upper portion, 92a and a second portion, i.e. a lower portion, 92b. Each of the first and second portions 92a and 92b of the steering shaft 92 also has opposing first and second ends.

The steering wheel 91 is connected to the first end of the first portion 92a of the steering shaft 92. The torque sensor 94 and the steering speed sensor 95 are mounted to the steering shaft 92. The torque sensor 94 is operative to measure torque based on a driver's steering operation of the steering shaft 92 as steering torque Ts, and output a measurement signal indicative of the measured steering torque Ts to the motor control apparatus 1.

For example, the torque sensor 94 includes a torsion bar 94a having opposing first and second ends. The second end of the first portion 92a of the steering shaft 92 is coaxially connected to the first end of the torsion bar 94a, and the second end of the torsion bar 94a is coaxially connected to the first end of the second portion 92b of the steering shaft 92.

The steering speed sensor 95 is operative to measure a steering speed Vs based on a driver's steering operation of the steering shaft 92, and output a measurement signal indicative of the measured steering speed Vs to the motor control apparatus 1.

The pinion gear 96 is mounted to the second end of the second portion 92b of the steering shaft 92.

The rack and axle 97 includes a rod-shaped rack with which the pinion gear 96 is engaged. The rack and axle 97 also includes tie rods each having opposing first and second ends. The first end of each of the tie rods is coupled to a corresponding one of both ends of the rod-shaped rack. One of the wheels 98 is mounted to the second end of a corresponding one of the tie rods, and the other of the wheels 98 is also mounted to the second end of a corresponding one of the tie rods.

Driver's turning of the steering wheel 91 causes the steering shaft 92 coupled to the steering wheel 91 to turn. This rotary motion, i.e. torque, of the steering shaft 92 is transformed to linear motion of the rack of the rack and axle 97. This linear motion of the rack of the rack and axle 97 causes the wheels 98 to steer via the respective tie rods. The steering angle of each of the wheels 98 is determined based on the axial displacement of the rack of the rack and axle 97.

The vehicle speed sensor 99 is capable of measuring a speed of the vehicle 50 based on, for example, the rotational speed of a transmission installed in the vehicle 50; the speed of the vehicle 50 will be referred to as a. vehicle speed Vc [km/h]. Then, the vehicle speed sensor 99 is capable of outputting a measurement signal indicative of the measured vehicle speed Vc to the motor control apparatus 1.

For example, the vehicle speed sensor 99 includes a rotating member to which a plurality of magnetic poles are mounted; the rotating member is configured to be rotated together with the transmission. The vehicle speed sensor 99 also includes a magnet resistive sensor that converts the change of magnetic flux generated based on rotation of the rotating member, i.e. rotation of the magnetic poles, into the change of an. electrical resistance. Then, the vehicle speed sensor 99 calculates, based on the change of the electrical resistance, the vehicle speed Vc.

Figure 2:
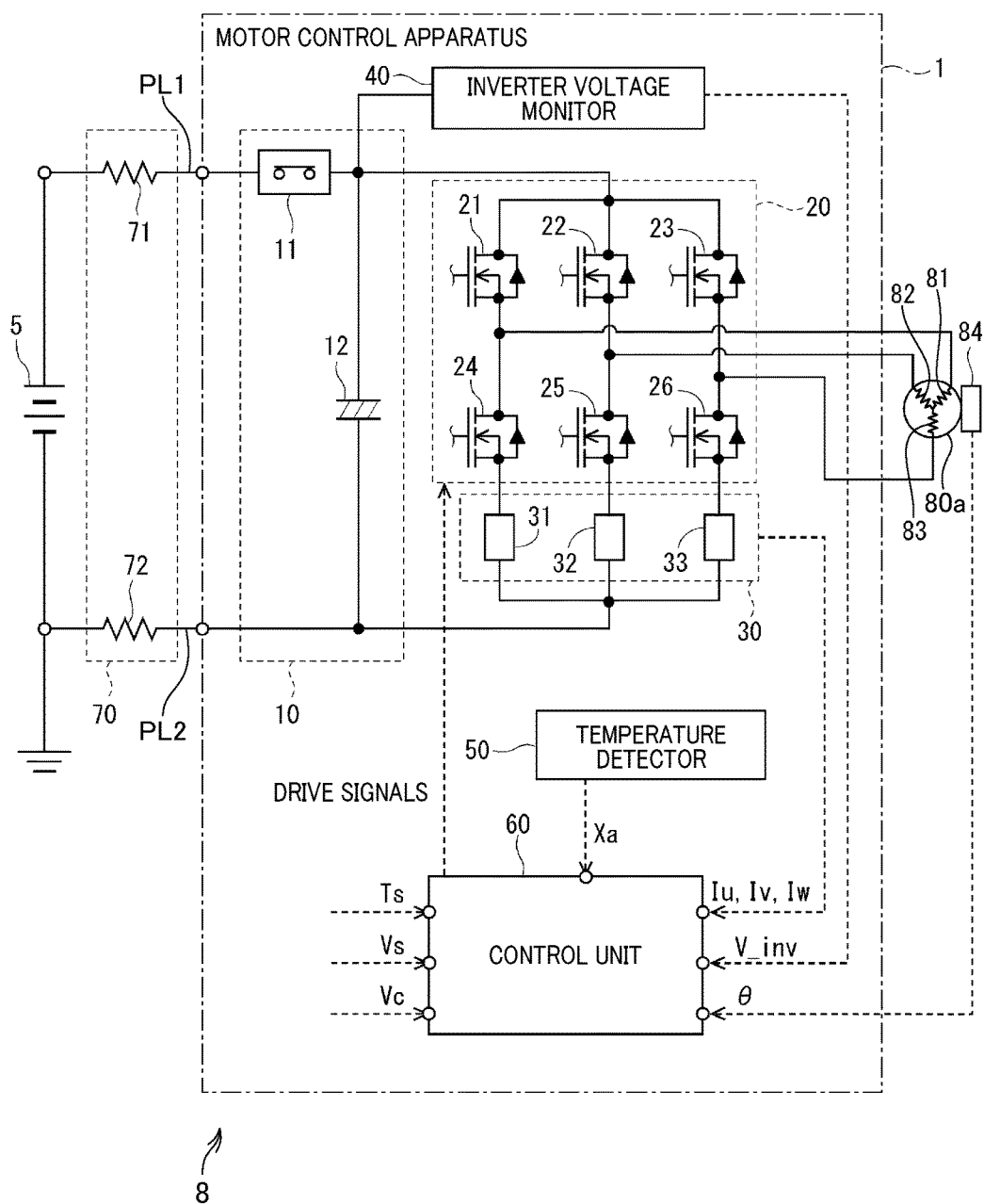
FIG. 2 is a circuit diagram schematically illustrating an example of the overall circuit structure of a motor control apparatus illustrated in FIG. 1.

Referring to FIGS. 1 and 2, the electric power steering system 8 includes, for example, a battery 5, a motor 80 with a shaft 85, a rotational angle sensor 84, and a deceleration gear mechanism 89 serving as, for example, a power transfer mechanism. In FIG. 2, the shaft 85, the deceleration gear mechanism 89 and torque sensor 94 are omitted from illustration.

The deceleration gear mechanism 89 includes, for example, a first gear coupled to the shaft 85 of the motor 80, and a second gear engaged with the first gear and mounted to the steering shaft 92. For example, the deceleration gear mechanism 89 is operative to transfer assist torque generated based on the turning of the shaft. 85 of the motor 80 to the steering shaft 92 while decelerating the rotational speed of the motor 80, i.e. increasing the assist torque generated by the motor 80 by a predetermined gear ratio between the first gear and the second gear.

The motor 80 is driven based on power supplied from the battery 5, which serves as a power supply, to generate assist torque that turns the first gear of the deceleration gear mechanism 89 in a predetermined forward direction or a predetermined reverse direction opposite to the forward direction.

The rotational speed sensor 84 includes, for example, a resolver, and is capable of measuring a rotational angle θ of the motor 80. Then, the rotational speed sensor 84 is capable of outputting a measurement signal indicative of the measured rotational angle θ of the motor 80 to the motor control apparatus 1. The rotational speed sensor 84 is also capable of measuring an angular velocity ω of the motor 80. Then, the rotational speed sensor 84 is capable of outputting a measurement signal indicative of the measured angular velocity ω of the motor 80, which will be referred to as a motor angular velocity ω, to the motor control apparatus 1.

Referring to FIGS. 1 and 2, the motor 80 is designed as, for example, a three-phase brushless motor comprised of, for example, a stator 80a, a rotor 80b, the shaft 85, and an unillustrated magnetic field member, such as permanent magnets, a field coil, and the like. The stator 80a includes, for example, an unillustrated stator core, and three-phase coils, i.e. U, V, and W-phase coils, 81, 82, and 83. The rotor 80b, to which the shaft 85 is mounted, is configured to be rotatable relative to the stator core together with the shaft 85. The three-phase coils 81, 82, and 83 are wound in, for example, slots of the stator core and around the stator core. The magnetic field member is mounted to the rotor 80b for generating a magnetic field. That is, the motor 80 is capable of rotating the rotor 80b based on magnetic interactions between the magnetic field generated by the magnetic field member of the rotor 80b and a rotating magnetic field generated by the three-phase coils 81, 82, and 83.

The rotor 80b has a direct axis (d-axis) in line with a direction of magnetic flux created by the magnetic field member. The rotor 80b also has a quadrature axis (q-axis) with a phase being π/2-radian electrical angle leading with respect to a corresponding d-axis during rotation of the rotor. In other words, the q-axis is electromagnetically perpendicular to the d-axis. The d and q axes constitute a d-q coordinate system, i.e. a two-phase rotating coordinate system, defined relative to the rotor 80b.

Note that currents flowing through the respective U, V, and W-phase coils 81, 82, and 83 will be referred to as motor currents or U-, V-, and W-phase currents Iu, Iv, and Iw.

The shaft 85 has opposing first and second ends in its axial direction. For example, the first end of the shaft 85 is located to face the motor control apparatus 1. The second end of the shaft 85 serves as an output terminal coupled to the deceleration gear 89 (see FIG. 1). This enables torque generated based on rotation of the rotor assembly, which is comprised of the rotor 80b and the shaft 85, to be transferred to the steering shaft 92 via the deceleration gear 89.

As described above, the electric power steering system 8 according to the common configuration is designed as a shaft assist system for assisting the turning of the steering shaft 92 based on the assist torque generated by the motor 80. As a modification, the electric power steering system 8 according to the common configuration can be designed as a rack assist system for assisting the axial displacement of the rack of the rack and axle 97 based on the assist torque generated by the motor 80. As another modification, the electric power steering system 8 according to the common configuration can be designed as a rack assist system for assisting the turning of the pinion gear 96 based on the assist torque generated by the motor 80.

First Embodiment

Next, the following describes an example of the electrical configuration of the electric power steering system 8 according to the first embodiment with reference to FIG. 2.

As illustrated in FIG. 2, the motor control apparatus 1 installed in the electric power steering system 8 is connected to a battery 5 via, for example, a harness including positive and negative power supply lines PL1 and PL2. That is, the positive power supply line PL1 is connected to the positive terminal of the battery 5, and the negative power supply line PL2 is connected to the negative terminal of the battery 5. The negative power supply line PL2 serves as a common signal ground of the motor control apparatus 1. The positive power supply line PL1 has a high-side resistor 71, and the negative power supply line PL2 has a low-side resistor 72; the high- and low-side resistors 71 and 72 serve as an interconnection resistance 70 between the battery 5 and the motor control apparatus 1.

The motor control apparatus 1 includes a power-supply input circuit 10, an inverter 20, a motor-current measuring unit 30, an inverter voltage monitor 40, a temperature detector 50, and a control unit 60.

The power-supply input circuit 10 is provided between the battery 5 and the inverter 20, which enables electrical power to be supplied therebetween.

Specifically, the power-supply input circuit 10 includes a power-supply shutoff unit 11 and a capacitor 12. The power-supply shutoff unit 11 is provided on the positive power supply line PL1 between the battery 5 and the inverter 20. The capacitor 12 is connected between the positive and negative power supply lines PL1 and PL2 in parallel to the battery 5.

The power-supply shutoff unit 11 is connected to the control unit 60, and operative to shut off the power supply from the battery 5 to the inverter 20 when controlled by the controller 60 or enables the power supply from the battery 5 to the inverter 20 when controlled by the controller 60.

The capacitor 12 is operative to reduce normal mode noise from the battery 5 to the inverter 20, and smooth fluctuations of a DC voltage, i.e. a power supply voltage, across the battery 5.

The inverter 20, which is an example of a power converter for converging input power to output power, is connected to the battery 5 via the power supply lines PL1 and PL2. The inverter 20 is operative to receive DC power, i.e. the power supply voltage, supplied from the battery 5, and convert the DC power into alternating-current (AC) power, i.e. an alternating-current voltage. Then, the inverter 20 is operative to apply the AC power to the three-phase coils 81, 82, and 83.

The inverter 20 is comprised of six switching elements 21 to 26 connected in bridge configuration.

Specifically, the switching elements 21 and 24 are a pair of U-phase upper- and lower-arm switches connected in series to each other, and the switching elements 22 and 25 are a pair of V-phase upper- and lower-arm switches connected in series to each other. Additionally, the switching elements 23 and 26 are a pair of W-phase upper- and lower-arm switches connected in series to each other.

The switching elements 21 to 26 are for example semiconductor switches, such as metal-oxide-semiconductor field-effect transistors (MOSFETs). The preferred embodiment uses MOSFETs as the respective switching elements 21 to 26, but can use other types of switches, such as insulated-gate bipolar transistors (IGBTs) or thyristors, in place of the MOSFETs. That is, one or more of various types of switches, such as MOSFETs or IGBTs, can be used for each of switching elements 21 to 26.

If the MOSFETs are used as the switching elements 21 to 26, the intrinsic diode of each of the MOSFETs 21 to 26 can serve as a flywheel diode connected in antiparallel to the corresponding one of the MOSFETs 21 to 26. Other flywheel diodes can be connected in antiparallel to the respective switching elements 21 to 26.

In the first embodiment, MOSFETs are used as the switching elements 21 to 26 as illustrated in FIG. 2.

That is, the source of each of the upper-arm switching elements 21 to 23 is connected to the drain of the corresponding one of the lower-arm switching elements 24 to 26.

The drains of the switching elements 21 to 23 are commonly connected to the positive terminal of the battery 5 via the positive power supply line PL1.

The connection point between the U-phase upper- and lower-arm switching elements 21 and 24 is connected to a first end of the U-phase coil 81, and the connection point between the V-phase upper- and lower-arm switching elements 22 and 25 is connected to a first end of the V-phase coil 82. Additionally, the connection point between the W-phase upper- and lower-arm switching elements 23 and 26 is connected to a first end of the W-phase coil 83. Second ends of the U, V-, and W-phase coils 81, 82, and 83, which are opposite to the first ends, are connected to a common junction, i.e. a neutral point, in, for example, a star-configuration.

The current measuring unit 30 includes current sensor elements 31, 32, and 33.

The sources of the switching elements 24 to 26 are respectively connected to first ends of respective current sensor elements 31 to 33. Second ends of the current sensors 31 to 33, which are opposite to their first ends, are connected to the negative terminal of the battery 5 via the common signal ground PL2. For example, each of the current sensing elements 31 to 33 is comprised of a shunt resistor or a Hall integrated circuit (IC).

The current sensor element 31, which is referred to as a U-phase current sensor element 31, is operative to output, to the control unit 60, a U-phase current parameter, such as a voltage thereacross, indicative of the U-phase current Iu flowing through the U-phase coil 81.

The current sensor element 32, which is referred to as a V-phase current sensor element 32, is operative to output, to the control unit 60, a V-phase current parameter, such as a voltage thereacross, indicative of the V-phase current Iv flowing through the V-phase coil 82.

The current sensor element 33, which is referred to as a W-phase current sensor element 33, is operative to output, to the control unit 60, a W-phase current parameter, such as a voltage thereacross, indicative of the W-phase current Iw flowing through the W-phase coil 83.

The inverter voltage monitor 40 is connected to the positive power supply line PL1 between the power-supply shutoff unit 11 and the upper-arm switches 21 to 23. The inverter voltage monitor 40 is operative to monitor a voltage from the battery 5 to the inverter 20 as an inverter voltage V_inv, and output the monitored inverter voltage V_inv to the control unit 60.

The temperature detector 50 includes, for example, a thermistor, as an example of a temperature-sensitive element, such as a ceramic semiconductor, having a variable electrical resistance depending on. temperature. The temperature detector 50 is operative to detect ambient temperature around the inverter 20. For example, the temperature detector 50 can measure, as an ambient temperature Xa [° C.], the temperature of the atmosphere around the inverter 20, such as the atmosphere around a circuit board to which the switching elements 21 to 26 are mounted, or the atmosphere around a circuit board to which the control unit 60 is mounted. Then, the temperature detector 50 outputs the ambient temperature Xa to the control unit 60.

The control unit 60 is comprised mainly of a microcomputer including, for example, a CPU and a memory unit including a ROM and a RAM. The CPU of the control unit 60 for example can run one or more programs, i.e. program instructions, stored in the memory unit, thus implementing various control tasks as software operations. As another example, the CPU of the control unit 60 can include a specific hardware electronic circuit to implement the various control tasks as hardware operations.

The control unit 60 is configured to receive the motor currents Iu, Iv, and Iw, the inverter voltage V_inv, the steering torque Ts, the steering speed Vs, the vehicle speed Vc, and the rotational angle θ. Then, the control unit 60 controls on-off switching operations of the respective switching elements 21 to 26 in accordance with the motor currents Iu, Iv, and Iw, the inverter voltage V_inv, the steering torque Ts, the steering speed Vs, the vehicle speed Vc, and the rotational angle θ to correspondingly control how the motor 80 is driven.

In particular, the control unit 60 performs a known pulse-width modulation (PWM) task that controls a duty of each of the switching elements 21 to 26 to correspondingly match the motor currents Iu, Iv, and Iw fed back thereto with three-phase command currents, which are described later. This PWM control generates drive signals for the respective switching elements 21 to 26. Each of the drive signals is configured to show an on command for changing the corresponding switching element from an off state to an on state, and an off command for changing the corresponding switching element from the on state to the off state. Each of the drive signals is, for example, designed as a pulse voltage signal with a controllable duty. The duty represents a controllable ratio, i.e. percentage, of an on-pulse width for each switching cycle. Note that the on command of the drive signal is expressed as a logical high-level (H) voltage signal, and the off command of the drive signal is expressed as a logical low-level (L) voltage signal.

The control unit 60 applies the respective drive signals to the corresponding control terminals, i.e. gates, of the switching elements 21 to 26 via, for example, pre-drivers, thus controlling on-off switching operations of the switching elements 21 to 26.

In particular, the control unit 60 is configured to complemental* turn on the upper- and lower-arm switching elements for each phase, so that the upper- and lower-arm switching elements for the corresponding phase are complementarily turned on.

Note that the control unit 60 can perform a known pulse-amplitude modulation (PAM) task that controls the amplitude of a pulse voltage applied to each of the switching elements 21 to 26 to correspondingly match the motor currents Iu, Iv, and Iw fed back thereto with the three-phase command currents.

Next, the following describes how the control unit 60 controls the inverter 20, and therefore the motor 80.

Figure 3:
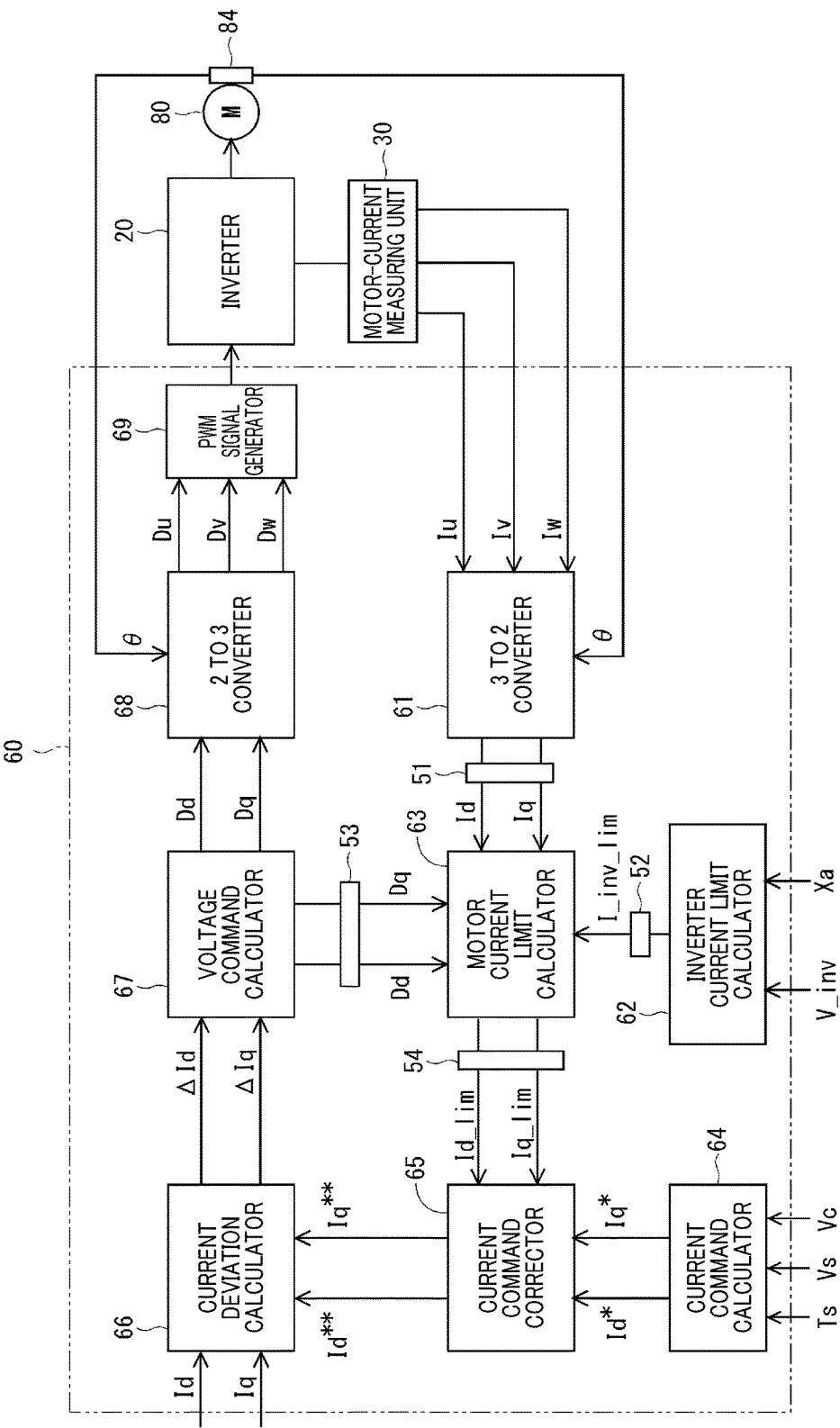
FIG. 3 is a block diagram schematically illustrating functional modules of a control unit illustrated in FIG. 2.

Referring to FIG. 3, the control unit 60 includes a three-phase to two-phase converter (3 TO 2 CONVERTER in FIG. 3) 61, a inverter current limit calculator 62, filters 51 to 54, and a motor current limit calculator 63. The control unit 60 also includes a current command calculator 64, a current command corrector 65, a current deviation calculator 66, a voltage command calculator 67, a two-phase to three-phase converter (2 TO 3 CONVERTER in. FIG. 3) 68, and a PWM signal generator 69.

The three-phase to two-phase converter 61 converts the three-phase currents Iu, Iv and Iw into d- and q-axis motor currents Id and Iq using the rotational angle θ of the motor 80 and, for example, a known conversion function or a map. The dq-axis motor current represents a reactive current component, i.e. a flux current component, in the d axis, and the q-axis motor current represents an active current component, i.e. a torque current component, contributing to generation of torque.

Thereafter, the three-phase to two-phase converter 61 feeds the d- and q-axis motor currents Id and Iq to the motor current limit calculator 63 and the current deviation calculator 66.

The inverter current limit calculator 62 calculates, based on the inverter voltage V_inv and the ambient temperature Xa, an upper limit for an inverter current I_inv input to the inverter 20, i.e. the upper limit for the magnitude of an inverter current vector I_inv; the upper limit of the inverter current I_inv will be referred to as an inverter current limit I_inv_lim. Based on the inverter current limit I_inv_lim and the rotational angle θ of the motor 80, the inverter current limit calculator 62 can calculates 1. An upper limit for a d-axis inverter input current as a d-axis inverter current limit Id_inv_lim in accordance with a predetermined function or map between the inverter current limit I_inv_lim, the rotational angle θ, and the d-axis inverter current limit Id_inv_lim.

2. An upper limit for a q-axis inverter input current as a q-axis inverter current limit Iq_inv_lim in accordance with a predetermined function or map between the inverter current limit I_inv_lim, the rotational angle θ, and the q-axis inverter current limit Iq_inv_lim.

For example, the inverter current limit calculator 62 can calculate, based on the inverter voltage V_inv and the ambient temperature Xa, the inverter current limit I_inv_lim in accordance with information IA indicative of a first predetermined function or map between the inverter current limit I_inv_lim and the inverter voltage V_inv, and a second predetermined function or map between the inverter current limit I_inv_lim and the ambient temperature Xa.

Figure 4:
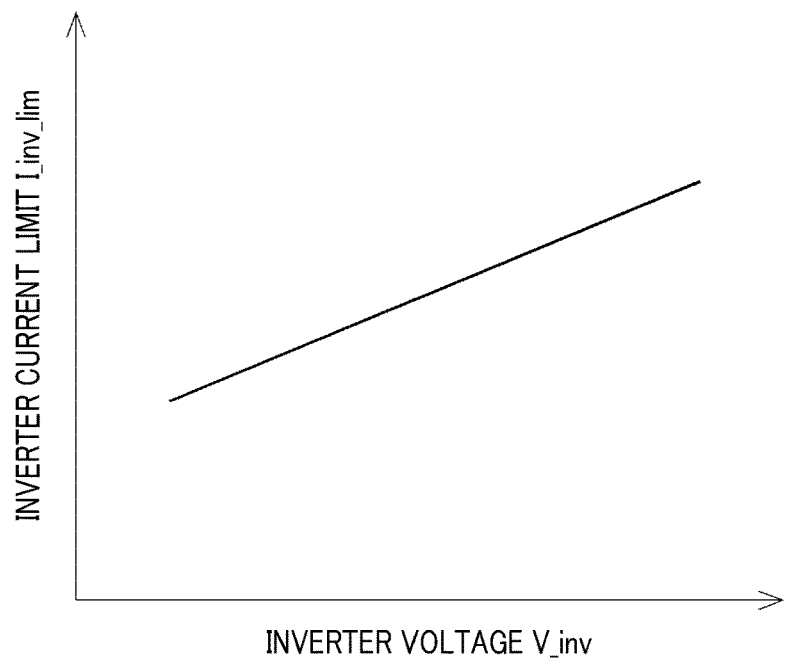
FIG. 4 is a graph schematically illustrating an example of the relationship between an inverter current limit and an inverter voltage according to the first embodiment.

Specifically, FIG. 4 illustrates a graph schematically illustrating the relationship defined by the first predetermined function or map. As illustrated in FIG. 4, the inverter current limit calculator 62 sets the inverter current limit I_inv_lim such that the inverter current I_inv_lim increases with an increase of the inverter voltage V_inv.

Figure 5:
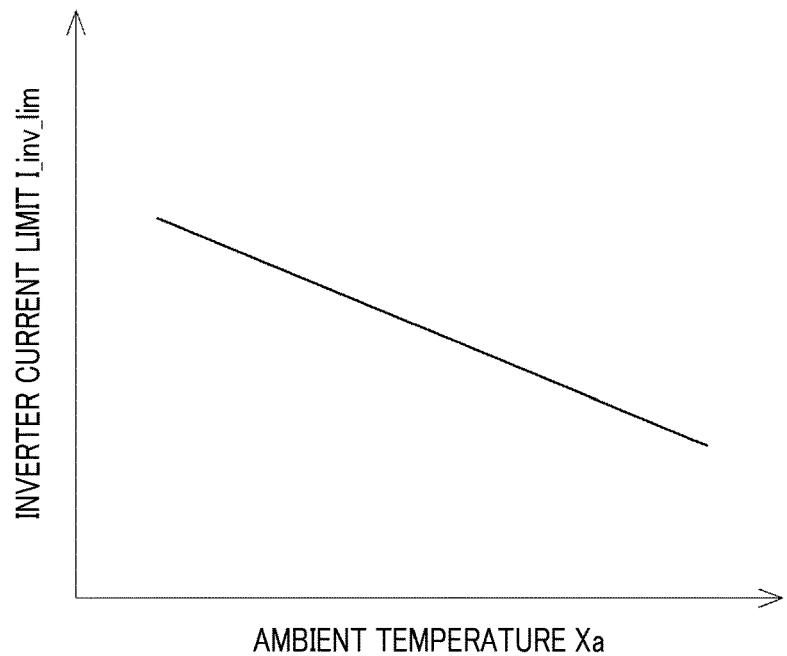
FIG. 5 is a graph schematically illustrating an example of the relationship between the inverter current limit and an ambient temperature according to the first embodiment.

In addition, FIG. 5 illustrates a graph schematically illustrating the relationship defined by the second predetermined function or map. As illustrated in FIG. 5, the inverter current limit calculator 62 sets the inverter current limit I_inv_lim such that the inverter current limit I_inv_lim decreases with an increase of the ambient temperature Xa.

The inverter current limit calculator 62 outputs the inverter current limit I_inv_lim, i.e. the d-axis inverter current limit Id_inv_lim and the q-axis inverter current limit Iq_inv_lim to the motor current limit calculator 63.

Each of the filters 51 to 54 is operative to limit the frequency range of at least one input signal to a predetermined narrow frequency range, and output the at least one input signal whose frequency range has been limited to the narrow frequency range.

In particular, each of the filters 51 to 54 is a low-pass filter operative to perform a frequency limiting task to 1. Eliminate, i.e. cut off, high-frequency components, which are higher than a predetermined threshold frequency, from the at least one input signal 2. Pass therethrough low-frequency components, which are equal to or lower than the predetermined threshold frequency Specifically, the filter 51 is provided between the three-phase to two-phase converter 61 and the motor current limit calculator 63. The filter 51 is operative to perform the frequency limiting task to the d- and q-axis motor currents Id and Iq to correspondingly output the d- and q-axis motor currents Id and whose frequencies have been limited, to the motor current limit calculator 63.

Similarly, the filter 52 is provided between the inverter current limit calculator 62 and the motor current limit calculator 63. The filter 52 is operative to perform the frequency limiting task to the inverter current limit I_inv_lim, whose frequencies have been limited, to the motor current limit calculator 63. That is, the filter 52 is operative to perform the frequency limiting task to each of the d- and q-axis inverter current limits Id_inv_lim and Iq_inv_lim whose frequencies have been limited, to the motor current limit calculator 63.

The filter 53 is provided between the voltage command calculator 67 and the motor current limit calculator 63. The filter 53 is operative to perform the frequency limiting task to d- and q-axis motor voltage duties Dd and Dq output from the voltage command calculator 67, which are described in detail later, to correspondingly output the d- and q-axis motor voltage duties Dd and Dq, whose frequencies have been limited, to the motor current limit calculator 63.

The motor current limit calculator 63 receives the d- and q-axis motor currents Id and Iq, whose frequencies have been limited, the inverter current limit I_inv_lim, whose frequencies have been limited, and the d- and q-axis motor voltage duties Dd and Dq, whose frequencies have been limited, fed back thereto. Then, the motor current limit calculator 63 calculates a d-axis motor current limit Id_lim and a q-axis motor current limit Iq_lim in accordance with the d- and q-axis motor currents Id and Iq, the inverter current limit I_inv_lim, and the d- and q-axis motor voltage duties Dd and Dq to correspondingly limit the inverter current I_inv to be equal to or lower than the inverter current limit I_inv_lim.

For example, the motor current limit calculator 63 calculates the d-axis motor current limit Id_lim and the q-axis motor current limit Iq_lim in accordance with the d- and q-axis motor currents Id and Iq, the inverter current limit I_inv_lim, the d- and q-axis motor voltage duties Dd and Dq, and the following relational equations [1] and [2] to correspondingly limit the inverter current I_inv to be equal to or lower than the inverter current limit I_inv_lim:

$$\mathrm{Id\_lim} = \left(\mathrm{I\_inv\_lim} - \frac{Dq \times Iq}{Kq} \times \frac{Kd}{Dd}\right) \quad [1]$$

$$\mathrm{Iq\_lim} = \left(\mathrm{I\_inv\_lim} - \frac{Dd \times Id}{Kd} \times \frac{Kq}{Dq}\right) \quad [2]$$

Where Kd is a constant meeting the following equation [3], and Kq is a constant meeting the following equation [4]:

$$Dd \times Kd \times V\_inv = Vd\_inv \quad [3]$$

$$Dq \times Kq \times V\_inv = Vq\_inv \quad [4]$$

Where Vd represents a d-axis voltage output from the inverter 20, and Vq represents a q-axis voltage output from the inverter 20.

The following describes how the relational equations [1] and [2] are derived.

Output power of the inverter 20 is expressed by the following equation [5]:

$$Winv = Vd \times Id + Vq \times Iq \quad [5]$$

Where Winv represents the output power of the inverter 20.

Transforming the d-axis voltage Vd and q-axis voltage Vq using the d- and q-axis motor voltage duties Dd and Dq and the inverter voltage V_inv can obtain the following equations [6] and [7]:

$$Vd = Dd \times Kd \times V\_inv \quad [6]$$

$$Vq = Dq \times Kq \times V\_inv \quad [7]$$

Using the equations [6] and [7] enables the fallowing equation [8] to be obtained:

$$Winv = \left(\frac{Dd}{Kd} \times Id + \frac{Dq}{Kq} \times Iq\right) \times V\_inv \quad [8]$$

Assuming that the input power to the inverter 20 is equal to the output power of the inverter 20, the following equations [9] to [11] can be established:

$$I\_inv = \frac{Winv}{V\_inv} = \frac{Dd}{Kd} \times Id + \frac{Dq}{Kq} \times Iq \quad [9]$$

$$Id = I\_inv - \frac{Dq \times Iq}{Kq} \times \frac{Kd}{Dd} \quad [10]$$

$$Iq = I\_inv - \frac{Dd \times Id}{Kd} \times \frac{Kq}{Dq} \quad [11]$$

Thus, the d-axis motor current limit Id_lim and the q-axis motor current limit Iq_lim can be expressed by the equations [1] and [2]:

$$\mathrm{Id\_lim} = \left(\mathrm{I\_inv\_lim} - \frac{Dq \times Iq}{Kq} \times \frac{Kd}{Dd}\right) \quad [1]$$

$$\mathrm{Iq\_lim} = \left(\mathrm{I\_inv\_lim} - \frac{Dd \times Id}{Kd} \times \frac{Kq}{Dq}\right) \quad [2]$$

Then, the second limit-current calculator 63 outputs the d-axis motor current limit Id_lim and the q-axis motor current limit Iq_lim to the current command corrector 65 via the filter 54.

Specifically, the filter 54 is provided between the motor current limit calculator 63 and the current command corrector 65. The filter 54 is operative to perform the frequency limiting task to the d- and q-axis motor current limits Id_lim and Iq_lim output from the motor current limit calculator 63 to correspondingly output the d- and q-axis motor current limits Id_lim and Iq_lim, whose frequencies have been limited, to the current command corrector 65.

The current command calculator 64 calculates a d-axis current command Id* and a q-axis current command Iq* in the d-q coordinate system of the rotor 80b of the motor 80 in accordance with the steering torque Ts, the steering speed Vs, and the vehicle speed Vc. The d-axis current command Id* and q-axis current command Iq* represent target values of the motor currents Iu, Iv, and Iw obtained based on the steering torque Ts, the steering speed Vs, and the vehicle speed Vc.

For example, the current command calculator 64 has a map in data-table format, in mathematical expression format, and/or program format. The map includes information indicative of the relationship among 1. Values of each of the d-axis current command Id* and the q-axis current command Iq*,
2. Values of the steering torque Ts,
3. Values of the steering speed Vs,
4. Values of the vehicle speed Vc Specifically, the current command calculator 64 refers to the map, and extracts a value of each of the d-axis current command Id* and the q-axis current command Iq* corresponding to the input value of each of the steering torque Ts, the input value of the steering speed Vs, and the input value of the vehicle speed Vc.

Then, the current command calculator 64 outputs the d-axis current command Id* and the q-axis current command Iq* to the current command corrector 65.

The current command corrector 65 receives the d-axis motor current limit Id_lim and the q-axis motor current limit Iq_lim output from the motor current limit calculator 63 via the filter 54. Then, the current command corrector 65 corrects the d-axis current command Id* and q-axis current command Iq* in accordance with the respective d-axis motor current limit Id_lim and the q-axis motor current limit Iq_lim to correspondingly obtain a corrected d-axis current command Id and a corrected q-axis current command Iq.

For example, the current command corrector 65 corrects the d-axis current command. Id* and q-axis current command Iq* to be lower than the respective d-axis motor current limit Id_lim and the q-axis motor current limit Iq_lim to correspondingly obtain the corrected d-axis current command Id and the corrected q-axis current command Iq.

Then, the current command corrector 65 outputs the corrected d-axis current command Id and the corrected q-axis current command Iq to the current deviation calculator 66.

The current deviation calculator 66 subtracts the d-axis motor current Id fed back from the three-phase to two-phase converter 61 from the corrected d-axis current command Id to thereby calculate a d-axis current deviation ΔId. In addition, the current deviation calculator 66 subtracts the q-axis motor current Iq fed back from the three-phase to two-phase converter 61 from the corrected q-axis current command Iq to thereby calculate a q-axis current deviation ΔIq. Then, the current deviation calculator 66 outputs the d-axis current deviation ΔId and the q-axis current deviation ΔIq to the voltage command calculator 67.

The voltage command calculator 67 performs a known proportional (P) feedback operation or a known proportional-integral (PI) feedback operation using the d-axis current deviation ΔId as input data to correspondingly calculate a d-axis motor voltage duty Dd; the d-axis motor voltage duty Dd causes the d-axis current deviation ΔId to converge to zero, thus causing the d-axis current Id to follow the corrected d-axis current command Id. In addition, the voltage command calculator 67 performs the known proportional (P) feedback operation or the known proportional-integral (PI) feedback operation using the q-axis current deviation ΔIq as input data to correspondingly calculate a q-axis motor voltage duty Dq; the q-axis motor voltage duty Dq causes the q-axis current deviation ΔIq to converge to zero, thus causing the q-axis current Iq to follow the corrected q-axis current command Iq.

Then, the voltage command calculator 67 outputs the d-axis motor voltage duty Dd and the q-axis motor voltage duty Dq to both the motor current limit calculator 63 via the third filter 53 described above and the two-phase to three-phase converter 68.

The two-phase to three-phase converter 68 receives the d-axis motor voltage duty Dd, the q-axis motor voltage duty Dq, and the rotational angle θ. As described above, each of the d-axis motor voltage duty Dd and the q-axis motor voltage duty Dq represents a controllable ratio, i.e. percentage, of an on-pulse width for each switching cycle.

Then, the two-phase to three-phase converter 68 converts the d-axis motor voltage duty Dd and the q-axis motor voltage duty Dq into three-phase motor voltage duty commands Du, Dv, and Dw using the rotational angle θ and, for example, map data or equation data. The map data or equation data represents correlations between values of the d-axis motor voltage duty Dd and the q-axis motor voltage duty Dq, values of the three-phase motor voltage duty commands Du, Dv, and Dw, and values of the rotational angle θ.

Thereafter, the two-phase to three-phase converter 68 outputs the three-phase motor voltage duty commands Du, Dv, and Dw to the PWM converter 69.

The PWM signal generator 69 calculates, based on the motor voltage duty commands Du, Dv, and Dw, three-phase sinusoidal voltage commands Vu*, Vv*, and Vw*. Then, the PWM signal generator 69 generates, based on the three-phase sinusoidal voltage commands Vu*, Vv*, and Vw*, drive signals for the respective switching elements 21, 24, 22, 25, 23, and 26. Thereafter, the PWM signal generator 69 applies the drive signals to the respective switching elements 21, 24, 22, 25, 23, and 26 to correspondingly perform on-off switching operations of the respective switching elements 21, 24, 22, 25, 23, and 26.

As compared to the above motor control apparatus 1 according to the first embodiment, the motor control apparatus disclosed in the published patent document is configured to limit, based on the voltage from a power source and the rotational angular velocity of a motor, a current, which is supplied from the power source to flow through an inverter as an inverter current, to be equal to or lower than a predetermined allowable upper limit.

Figure 6A:
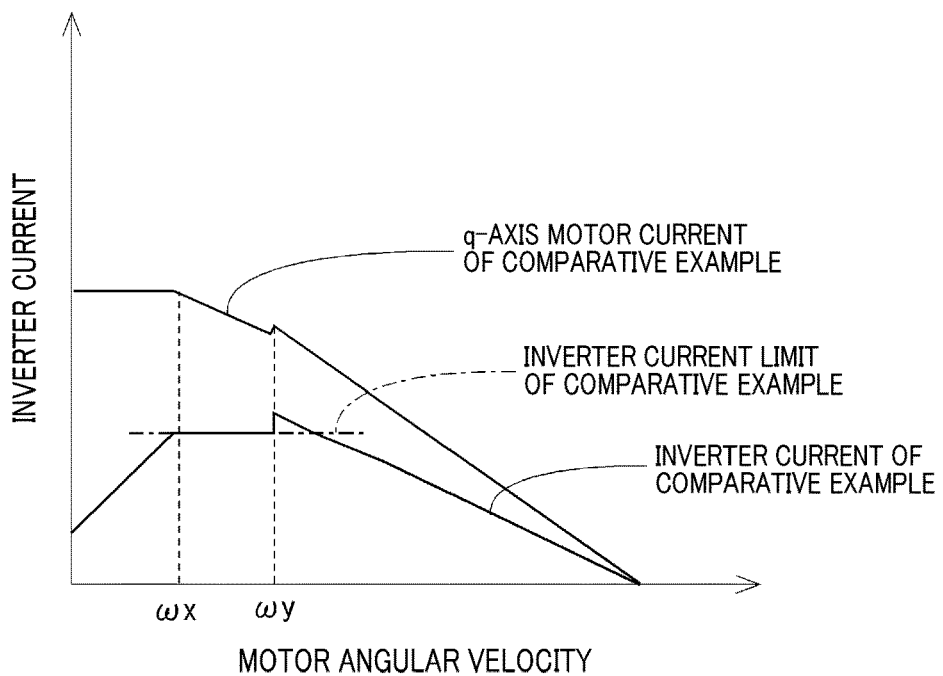
FIG. 6A is a graph schematically illustrating an example of the relationship between an inverter current and a rotational angular velocity of a motor achieved by a motor control apparatus according to a comparative example, which is configured to limit, based on the rotational angular velocity of the motor, the inverter current.
Figure 6B:
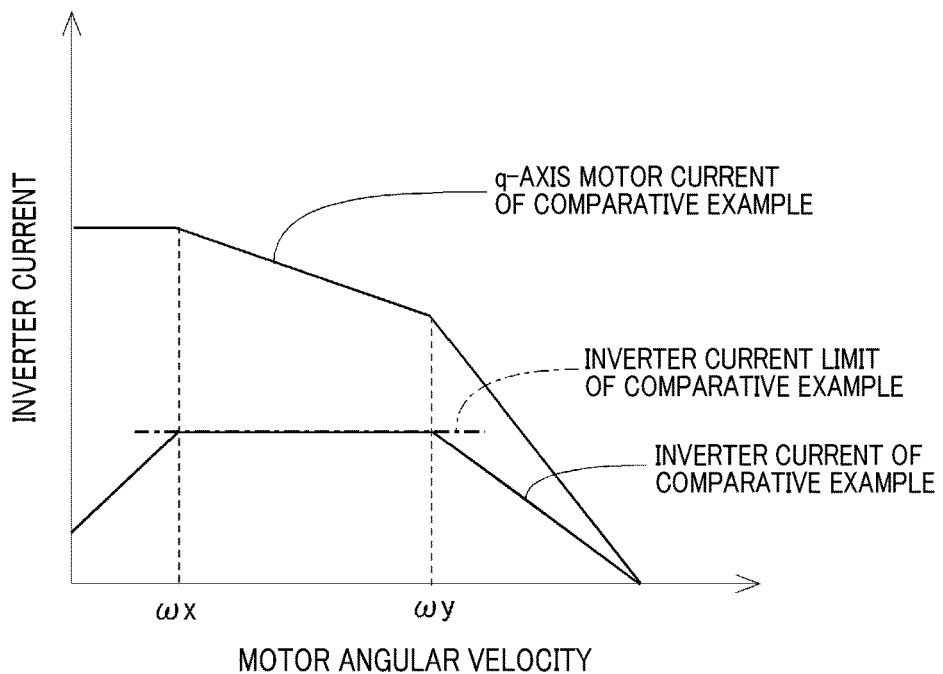
FIG. 6B is a graph schematically illustrating another example of the relationship between the inverter current and the rotational angular velocity of the motor achieved by the motor control apparatus according to the comparative example.

Each of FIGS. 6A and 6B illustrates a relationship between the inverter current and the rotational angular velocity of the motor achieved by such a motor control apparatus according to a comparative example, which is configured to limit, based on the rotational angular velocity of the motor, the inverter current.

As illustrated in FIG. 6A, the motor control apparatus according to the comparative example has a first configuration that limits the inverter current to be equal to or lower than a predetermined allowable upper limit IA upon the rotational angular velocity of the motor being within a predetermined range from ωx to ωy inclusive. In contrast, as illustrated in FIG. 6B, the motor control apparatus according to the comparative example has a second configuration that limits the inverter current to be equal to or lower than the predetermined allowable upper limit IA upon the rotational angular velocity of the motor being within a predetermined range from ωx to ωz inclusive. The range from ωx to ωz is longer than the range from ωx to ωy.

In each of FIGS. 6A and 6B, the q-axis motor current and the inverter current are illustrated by respective solid lines, and the predetermined allowable upper limit IA is illustrated by a dot-and-dash line.

FIG. 6A illustrates that a change in a resistance component, such as a resistance in wires between a power source to the motor control apparatus, in a torque constant and/or in a back-emf constant, which are parameters representing the characteristics of the motor, causes the inverter current to exceed the allowable upper limit IA at the rotational angular velocity ωy. This is because an optimum rotational angular velocity, which enables the inverter current to be limited to be equal to or lower than the allowable upper limit IA, is deviated from the rotational angular velocity ωy.

For addressing such a problem illustrated in FIG. 6A, the second configuration excessively limits the inverter current over the range from ωx to ωz, which is longer than the range from ωx to ωy. This however may result in a reduction of the output of the motor.

In contrast, the motor control apparatus 1 according to the first embodiment and the electric power steering system 8 using the motor control apparatus 1 are each capable of stably controlling the inverter current I_inv while optimally controlling the output of the motor 80.

Specifically, the motor current limit calculator 63 determines the d-axis motor-current limit Id_lim and q-axis motor-current limit Iq_lim in accordance with the respective d- and q-axis motor voltage duties Dd and Dq fed back from the voltage command calculator 67.

A change in the interconnection resistance 70 between the battery 5 and the motor control apparatus 1 causes the inverter voltage V_inv to change. In addition, a change in the characteristics of the motor 80 due to a change in the torque constant and in the back-emf constant causes the d- and q-axis motor currents Id and Iq to change.

For addressing such a change in the inverter voltage V_inv and/or a change in the d- and q-axis motor currents Id and Iq, the control unit 60 is configured to calculate the d- and q-axis motor voltage duties Dd and Dq such that the calculated d- and q-axis motor voltage duties Dd and Dq depend on the inverter voltage V_inv and the d- and q-axis motor currents Id and Iq. This therefore results in the calculated d- and q-axis motor voltage duties Dd and Dq depending on a change in the interconnection resistance 70, in the torque constant, and/or in the back-emf constant.

More specifically, the motor control apparatus 1 according to the first embodiment is configured to adjust the d- and q-axis motor voltage duties Dd and Dq to thereby match the d- and q-axis motor currents Id and Iq with the respective corrected d- and q-axis current commands Id and Iq while factoring in a change of the inverter voltage V_inv due to a change in the interconnection resistance 70.

Similarly, the motor control apparatus 1 according to the first embodiment is configured to adjust the d- and q-axis motor voltage duties Dd and Dq to thereby match the d- and q-axis currents Id and Iq with the respective corrected d- and q-axis current commands Id** and Iq* while factoring in a change in the d- and q-axis currents Id and Iq due to a change in the torque constant, and/or in the back-emf constant of the motor 80.

This configuration therefore enables a change in at least one of the interconnection resistance 70 and a change in the torque constant and/or in the back-emf constant of the motor 80 to be reflected in the d- and q-axis motor voltage duties Dd and Dq.

In particular, the motor control apparatus 1 is configured to determine each of the d-axis motor current limit Id_lim and the q-axis motor current limit Iq_lim in accordance with the d- and q-axis motor voltage duties Dd and Dq. That is, the d-axis motor voltage duty Dd is based on the deviation ΔId between the actual d-axis motor current Id and the corrected d-axis current command Id that is limited based on the d-axis motor-current limit Id_lim. Similarly, the q-axis motor voltage duty Dq is based on the deviation ΔIq between the actual q-axis motor current Iq and the corrected q-axis current command Iq that is limited based on the q-axis motor-current limit Iq_lim. Because the deviations ΔId and ΔIq depend on a change in the torque constant, and/or in the back-emf constant of the motor 80, this configuration of the motor control apparatus 1 enables the inverter current I_inv to be stably controlled even in a case of a change in the torque constant, and/or in the back-emf constant of the motor 80.

To sum up, calculating the d-axis inverter current limit Id_inv_lim and q-axis inverter current limit Iq_inv_lim in accordance with the respective d- and q-axis motor voltage duties Dd and Dq enables the d-axis inverter current limit Id_inv_lim and q-axis inverter current limit Iq_inv_lim to be determined depending on a change in the interconnection resistance 70, in the torque constant, and/or in the back-emf constant. This makes it possible to stably control the inverter current I_inv without sacrificing the output of the motor 80. This enables the output of the motor 80 to be optimally controlled.

Figure 7A:
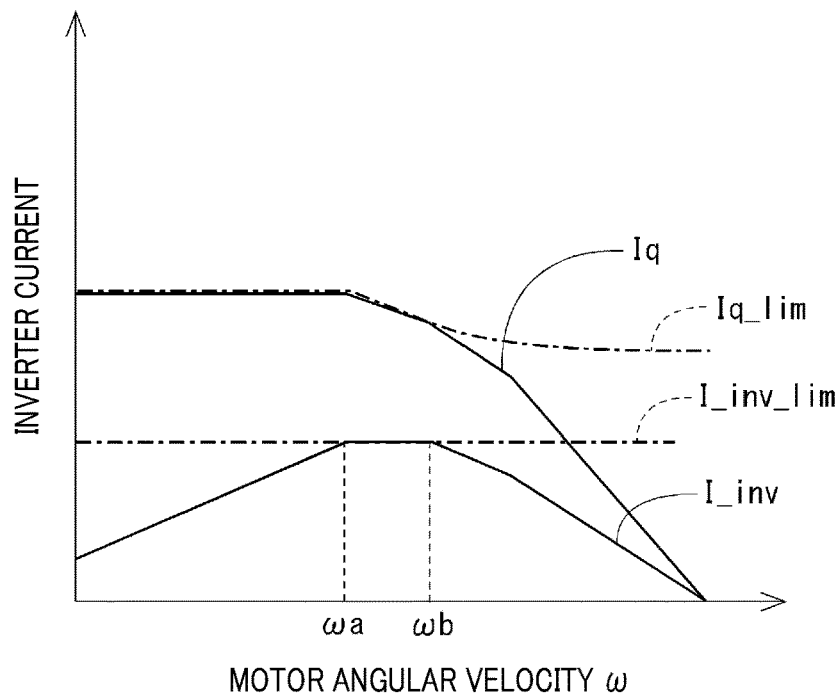
FIG. 7A is a graph schematically illustrating an example of the relationship among a q-axis motor current, the inverter current, a q-axis motor current limit, the inverter current limit, and a motor angular velocity in the occurrence of a change in an interconnection resistance.
Figure 7B:
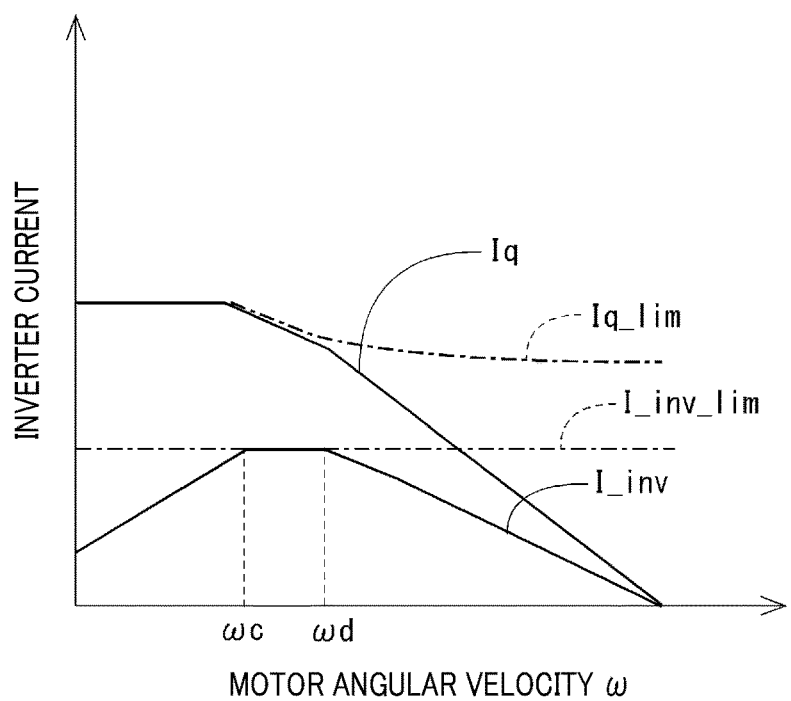
FIG. 7B is a graph schematically illustrating another example of the relationship among the q-axis motor current, the inverter current, the q-axis motor current limit, the inverter current limit, and the motor angular velocity in the occurrence of a change in the interconnection resistance.
Figure 8:
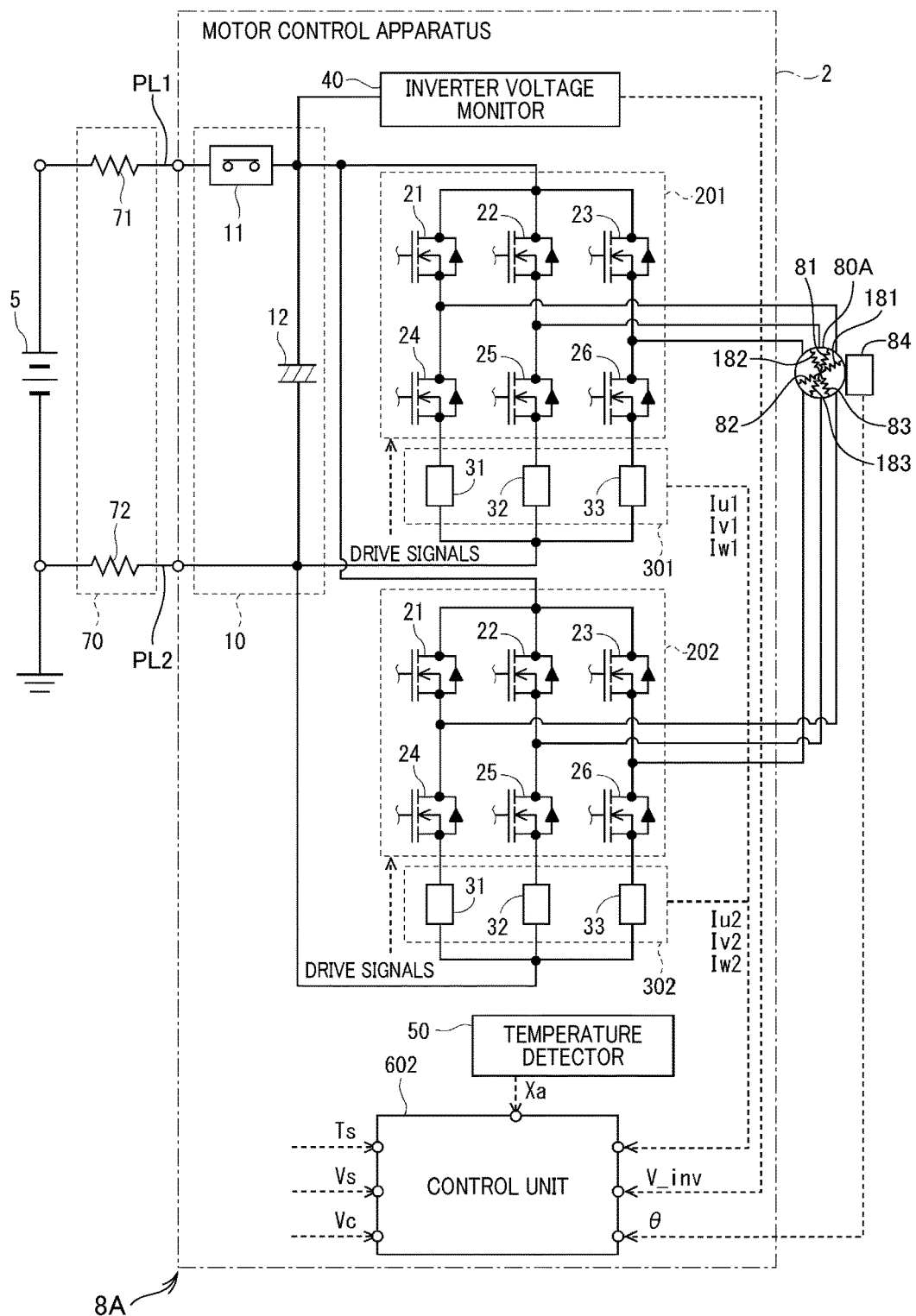
FIG. 8 is a circuit diagram schematically illustrating an example of the overall circuit structure of a motor control apparatus according to the second embodiment of the present disclosure.

The following demonstrates the above advantageous effects using FIGS. 7A and 7B.

Each of FIGS. 7A and 7B illustrates a relationship among the q-axis motor current Iq, the inverter current I_inv, the q-axis motor current limit Iq_lim, the inverter current limit I_inv_lim, and the motor angular velocity ω in the occurrence of a change in the interconnection resistance 70. In particular, FIG. 7A illustrates the relationship upon a value of the interconnection resistance 70 is higher than a value of the interconnection resistance 70 in the relationship illustrated in FIG. 7B.

In each of FIGS. 7A and 7B, the q-axis motor current Iq and the inverter current I_inv are illustrated by respective solid lines, and the q-axis motor current limit Iq_lim and the inverter current limit I_inv_lim are illustrated by respective dot-and-dash lines.

FIG. 7A shows that the inverter current I_inv is limited to be equal to or lower than the inverter current limit I_inv_lim upon the motor angular velocity ω being within a predetermined range from ωa to ωb inclusive.

In addition, FIG. 7B shows that the inverter current I_inv is limited to be equal to or lower than the inverter current limit I_inv_lim upon the motor angular velocity ω being within a predetermined range from ωc to ωd inclusive; the range from ωc to ωd is different from the range from ωa to ωb.

That is, the motor control apparatus 1 enables the inverter current I_inv to be stably limited to be equal to or lower than the inverter current limit I_inv_lim independently of the motor angular velocity ω even in the case of the occurrence of a change in the interconnection resistance 70.

In addition, a change in the ambient temperature Xa may cause an allowable upper limit for the inverter current I_inv to change.

From this viewpoint, the inverter current limit calculator 62 of the motor control apparatus 1 is configured to calculate the inverter current limit I_inv_lim in accordance with the ambient temperature Xa. This configuration enables the inverter current limit I_inv_lim to likely depend on the ambient temperature Xa, resulting in more stable control of the inverter current I_inv.

Second Embodiment

Figure 9:
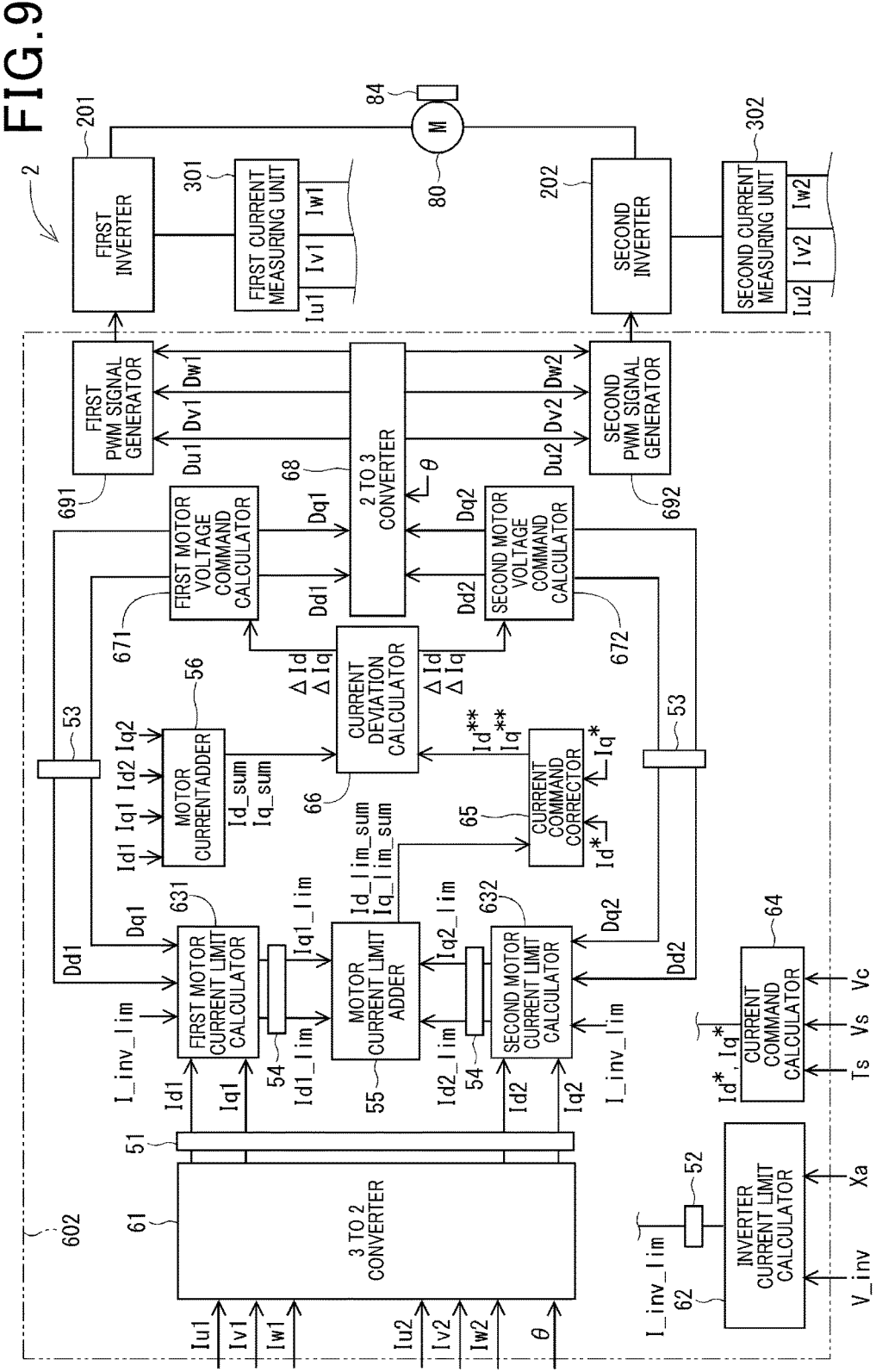
FIG. 9 is a block diagram schematically illustrating functional modules of a control unit illustrated in FIG. 8.

Next, the following describes an example of the electrical configuration of an electric power steering system 8A according to the second embodiment with reference to FIG. 9. The second embodiment differs from the first embodiment in the following points. So, the following mainly describes the different points, and omits or simplifies descriptions of like parts between the first and second embodiments, to which identical or like reference characters are assigned, thus eliminating redundant description.

The electric power steering system 8A includes a motor 80A and a motor control apparatus 2.

The motor 80A includes a stator 80a1, which is different from the motor 80 according to the first embodiment.

The stator 80a1 includes a first set of e three-phase coils (U, V, and W-phase coils) 81, 82, and 83 wound in and around the stator core, and a second set of three-phase stator coils (U, V, and W-phase coils) 181, 182, and 183 wound in and around the stator core.

Note that currents flowing through the respective U, V, and W-phase coils 81, 82, and 83 will be referred to as first motor currents or first. U-, V-, and W-phase currents Iu1, Iv1, and Iw1, and currents flowing through the respective U, V, and W-phase coils 181, 182, and 183 will be referred to as second motor currents or second U-, V-, and W-phase currents Iu2, Iv2, and Iw2.

The motor control apparatus 2 includes the power-supply input circuit 10, the power-supply shutoff unit 11, a first inverter 201, a second inverter 202, a first motor-current measuring unit 301, a second motor-current measuring unit 302, the inverter voltage monitor 40, the temperature detector 50, and a control unit 602.

Each of the first and second inverters 201 and 202, which is connected to the battery 5 via the power supply lines PL1 and PL2, includes the six switching elements 21 to 26 connected in bridge configuration, which is similar to the inverter 20.

The connections between the power-supply input circuit 10 and each of the first and second inverters 201 and 202 are substantially identical to the connections between the power-supply input circuit 10 and the inverter 20.

The connections between the motor 80 and each of the first and second inverters 201 and 202 are substantially identical to the connections between the motor 80 and the inverter 20.

Specifically, the connection point between the U-phase upper- and lower-arm switching elements 21 and 24 of each of the first and second inverters 201 and 202 is connected to the first end of the U-phase coil 81, and the connection point between the V-phase upper- and lower-arm switching elements 22 and 25 of each of the first and second inverters 201 and 202 is connected to the first end of the V-phase coil 82. Additionally, the connection point between the W-phase upper- and lower-arm switching elements 23 and 26 of each of the first and second inverters 201 and 202 is connected to the first end of the W-phase coil 83.

Each of the first and second current measuring units 301 and 302 includes the current sensor elements 31, 32, and 33. The sources of the switching elements 24 to 26 of the first inverter 201 are respectively connected to the first ends of the respective current sensor elements 31 to 33 of the first current measuring unit 301. The second ends of the current sensors 31 to 33 of the first current measuring unit 301 are connected to the negative terminal of the battery 5 via the common signal ground PL2. Similarly, the sources of the switching elements 24 to 26 of the second inverter 202 are respectively connected to the first ends of the respective current sensor elements 31 to 33 of the second current measuring unit 302. The second ends of the current sensors 31 to 33 of the second current measuring unit 302 are connected to the negative terminal of the battery 5 via the common signal ground PL2.

Each of the current sensor elements 31 to 33 of the first current measuring unit 301 is operative to output, to the control unit 602, a corresponding one of the U-, V-, and W-phase current parameters indicative of a corresponding one of the first motor currents Iu1, Iv1, and Iw1 that flow through the respective U-, V-, and W-phase coils 81, 82, and 83. Each of the current sensor elements 31 to 33 of the second current measuring unit 302 is operative to output, to the control unit 602, a corresponding one of the U-, V-, and W-phase current parameters indicative of a corresponding one of the second motor currents Iu2, Iv2, and Iw2 that flow through the respective U-, V-, and W-phase coils 181, 182, and 183.

The temperature detector 50 is operative to detect the ambient temperature Xa around the first and second inverters 201 and 202, and output the ambient temperature Xa to the control unit 602.

Referring to FIG. 9, the control unit 602 includes a motor current limit adder 55, a motor current adder 56, the three-phase to two-phase converter 61, the inverter current limit calculator 62, the filters 51 to 54, and first and second motor current limit calculators 631 and 632. The control unit 602 also includes the command current calculator 64, the current command corrector 65, the current deviation calculator 66, first and second voltage command calculators 671 and 672, the two-phase to three-phase converter 68, and first and second PWM signal generators 691 and 692.

The first inverter 201 and the first current measuring unit 301 correspond to the first motor current limit calculator 631, the first voltage command calculator 671, and the first PWM signal generator 691. Similarly, the second inverter 202 and the second current measuring unit 302 correspond to the second motor current limit calculator 632, the second voltage command calculator 672, and the second PWM signal generator 692.

The three-phase to two-phase converter 61 converts the first motor currents Iu1, Iv1 and Iw1 into first d- and q-axis motor currents Id1 and Iq1 using the rotational angle θ of the motor 80 in the same manner as the first embodiment. Similarly, the three-phase to two-phase converter 61 converts the second motor currents Iu2, Iv2 and Iw2 into second d- and q-axis motor currents Id2 and Iq2 using the rotational angle θ of the motor 80 in the same manner as the first embodiment.

Thereafter, the three-phase to two-phase converter 61 feeds the first d- and q-axis motor currents Id1 and Iq1 to the first motor current limit calculator 631 via the filter 51, and feeds the second d- and q-axis motor currents Id2 and Iq2 to the second motor current limit calculator 632 via the filter 51.

The first motor current limit calculator 631, which corresponds to the first voltage command calculator 671 and the first PWM signal generator 691, calculates a first d-axis motor current limit Id1_lim and a first q-axis motor current limit Iq1_lim in accordance with the first d- and q-axis motor currents Id1 and Iq1, the inverter current limit I_inv_lim, and first d- and q-axis motor voltage duties Dd1 and Dq1 described later to correspondingly limit the inverter current I_inv to be equal to or lower than the inverter current limit I_inv_lim in the same manner as the first embodiment.

Similarly, the second motor current limit calculator 632, which corresponds to the second voltage command calculator 672 and the second PWM signal generator 692, calculates a second d-axis motor current limit Id2_lim and a second q-axis motor current limit Iq2_lim in accordance with the second d- and q-axis motor currents Id2 and Iq2, the inverter current limit I_inv_lim, and second d- and q-axis motor voltage duties Dd2 and Dq2 described later to correspondingly limit the inverter current I_inv to be equal to or lower than the inverter current limit I_inv_lim in the same manner as the first embodiment.

In the second embodiment there are two filters 53 and two filters 54. One of the filters 54 is provided between the first motor current limit calculator 631 and the motor current limit adder 55, and the other of the filters 54 is provided between the second motor current limit calculator 632 and the motor current limit adder 55.

The motor current limit adder 55 receives the first d-and q-axis motor current limits Id1_lim and Iq1_lim which have been filtered by the corresponding filter 54, and receives the second- and q-axis motor current limits Id2_lim and Iq2_lim, which have been filtered by the corresponding filter 54. Then, the motor current limit adder 55 adds the first and second d-axis motor current limits Id1_lim and Id2_lim to each other to correspondingly calculate the sum of the first and second d-axis motor current limits Id1_lim and Id2_lim as a d-axis motor current-limit sum Id_lim_sum. In addition, the motor current limit adder 55 adds the first and second q-axis motor current limits Iq1_lim and Iq2_lim to each other to correspondingly calculate the sum of the first and second q-axis motor current limits Iq1_lim and Iq2_lim as a q-axis motor current-limit sum Iq_lim_sum.

Then, the motor current limit adder 55 outputs the d-axis motor current-limit sum Id_lim_sum and the q-axis motor current-limit sum Iq_lim_sum to the current command corrector 65.

The current command corrector 65 receives the d-axis motor current-limit sum Id_lim_sum and the q-axis motor current-limit sum Iq_lim_sum output from the motor current limit adder 55. Then, the current command corrector 65 corrects the d-axis current command Id* and q-axis current command Iq* in accordance with the respective d-axis motor current-limit sum Id_lim_sum and the q-axis motor current-limit sum Iq_lim_sum to correspondingly obtain a corrected d-axis current command Id and a corrected q-axis current command Iq. Thereafter, the current command corrector 65 outputs the corrected d-axis current command Id and corrected q-axis current command Iq to the current deviation calculator 66.

The motor current adder 56 is configured to receive the first d- and q-axis motor currents Id1 and Iq1 and the second d- and q-axis motor currents Id2 and Iq2, which have been sent from the three-phase to two-phase converter 61 and filtered by the filter 51. Then, the motor current adder 56 adds the first and second d-axis motor currents Id1 and Id2 to each other to correspondingly calculate the sum of the first and second d-axis motor currents Id1 and Id2 as a d-axis motor current sum Id_sum. In addition, the motor current adder 56 adds the first and second q-axis motor currents Iq1 and Iq2 to each other to correspondingly calculate the sum of the first and second q-axis motor currents Iq1 and Iq2 as a q-axis motor current sum Iq_sum. Thereafter, the motor current adder 56 outputs the d-axis motor current sum Id_sum. and the q-axis motor current sum Iq_sum to the current deviation calculator 66.

The current deviation calculator 66 subtracts the d-axis motor current sum Id_sum from the corrected d-axis current command Id to thereby calculate a d-axis current deviation ΔIdA. In addition, the current deviation calculator 66 subtracts the q-axis motor current sum Iq_sum from the corrected q-axis current command Iq to thereby calculate a q-axis current deviation ΔIqA. Then, the current deviation calculator 66 outputs the d-axis current deviation ΔIdA and the q-axis current deviation ΔIqa to each of the first and second voltage command calculators 671 and 672.

The first voltage command calculator 671 performs the known proportional feedback operation or the known proportional-integral feedback operation using the d-axis current deviation ΔIdA and the q-axis current deviation ΔIqA as input data to correspondingly calculate a first d-axis motor voltage duty Dd1 and a first q-axis motor voltage duty Dq1 in the same manner as the voltage command calculator 67. Each of the d- and q-axis motor voltage duties Dd1 and Dq1 causes the corresponding one of the d- and q-axis current deviations ΔIdA and ΔIqA to converge to zero. Then, the first voltage command calculator 671 outputs the d-axis motor voltage duty Dd1 and the q-axis motor voltage duty Dq1 to both the first motor current limit calculator 631 via the third filter 53 and the two-phase to three-phase converter 68.

Similarly, the second voltage command calculator 672 performs the known proportional feedback operation or the known proportional-integral feedback operation using the d-axis current deviation ΔIdA and the q-axis current deviation ΔIqA as input data to correspondingly calculate a second d-axis motor voltage duty Dd2 and a second q-axis motor voltage duty Dq2 in the same manner as the voltage command calculator 67. Each of the d- and q-axis motor voltage duties Dd2 and Dq2 causes the corresponding one of the d- and q-axis current deviations ΔIdA and ΔIqA to converge to zero. Then, the second voltage command calculator 672 outputs the d-axis motor voltage duty Dd2 and the q-axis motor voltage duty Dq2 to both the second motor current limit calculator 632 via the third filter 53 and the two-phase to three-phase converter 68.

The two-phase to three-phase converter 68 receives the first d-axis motor voltage duty Dd1, the first q-axis motor voltage duty Dq1, the second d-axis motor voltage duty Dd2, the second q-axis motor voltage duty Dq2, and the rotational angle θ.

Then, the two-phase to three-phase converter 68 converts the first d-axis motor voltage duty Dd1 and the first q-axis motor voltage duty Dq1 into first three-phase motor voltage duty commands Du1, Dv1, and Dw1 using the rotational angle θ and, for example, the map data or equation data. Similarly, the two-phase to three-phase converter 68 converts the second d-axis motor voltage duty Dd2 and the second q-axis motor voltage duty Dq2 into second three-phase motor voltage duty commands Du2, Dv2, and Dw2 using the rotational angle θ and, for example, the map data or equation data.

Thereafter, the two-phase to three-phase converter 68 outputs the first three-phase motor voltage duty commands Du1, Dv1, and Dw1 to the first PWM converter 691, and outputs the second three-phase motor voltage duty commands Du2, Dv2, and Dw2 to the second PWM converter 692.

The first PWM signal generator 691 calculates, based on the first motor voltage duty commands Du1, Dv1, and Dw1, first three-phase sinusoidal voltage commands Vu1*, Vv1*, and Vw1*. Then, the first PWM signal generator 691 generates, based on the first three-phase sinusoidal voltage commands Vu1*, Vv1*, and Vw1*, first drive signals for the respective switching elements 21, 24, 22, 25, 23, and 26 of the first inverter 201. Thereafter, the first PWM signal generator 691 applies the first drive signals to the respective switching elements 21, 24, 22, 25, 23, and 26 of the first inverter 201 to correspondingly perform on-off switching operations of the respective switching elements 21, 24, 22, 25, 23, and 26 of the first inverter 201.

Similarly, the second. PWM signal generator 692 calculates, based on the second motor voltage duty commands Dug, Dv2, and Dw2, second three-phase sinusoidal voltage commands Vu2*, Vv2*, and Vw2*. Then, the second PWM signal generator 692 generates, based on the second three-phase sinusoidal voltage commands Vu2*, Vv2*, and Vw2*, second drive signals for the respective switching elements 21, 24, 22, 25, 23, and 26 of the second inverter 202. Thereafter, the second PWM signal generator 692 applies the second drive signals to the respective switching elements 21, 24, 22, 25, 23, and 26 of the second inverter 202 to correspondingly perform on-off switching operations of the respective switching elements 21, 24, 22, 25, 23, and 26 of the second inverter 202.

As described above, the control unit 602 according to the second embodiment is configured to 1. Calculate the first d- and q-axis motor voltage duties Dd1 and Dq1 such that the calculated first d- and q-axis motor voltage duties Dd1 and Dq1 depend on the inverter voltage V_inv and the first d- and q-axis motor current Id1 and Iq1.

2. Calculate the second d- and q-axis motor voltage duties Dd2 and Dq2 such that the calculated second d- and q-axis motor voltage duties Dd2 and Dq2 depend on the inverter voltage V_inv and the second d- and q-axis motor currents Id2 and Iq2

This therefore results in

1. The calculated first d- and q-axis motor voltage duties Dd1 and Dq1 depending on a change in the interconnection resistance 70, in the torque constant, and/or in the back-emf constant 2. The calculated second d- and q-axis motor voltage duties Dd2 and Dq2 depending on a change in the interconnection resistance 70, in the torque constant, and/or in the back-emf constant Therefore, calculating the first d- and q-axis inverter current limits Id1_inv_lim and Iq1_inv_lim in accordance with the respective first d- and q-axis motor voltage duties Dd1 and Dq1 and calculating the second d- and q-axis inverter current limits Id2_inv_lim and Iq2_inv_lim in accordance with the respective second d- and q-axis motor voltage duties Dd2 and Dq2 enables 1. The first d- and q-axis inverter current limits Id1_inv_lim and Iw1_inv_lim to be determined depending on a change in the interconnection resistance 70, in the torque constant, and/or in the back-emf constant 2. The second d- and q-axis inverter current limits Id2_inv_lim and Iq2_inv_lim to be determined depending on a change in the interconnection resistance 70, in the torque constant, and/or in the back-emf constant This therefore achieves the advantageous effects, which are similar to those achieved by the first embodiment.

Third embodiment

Figure 10:
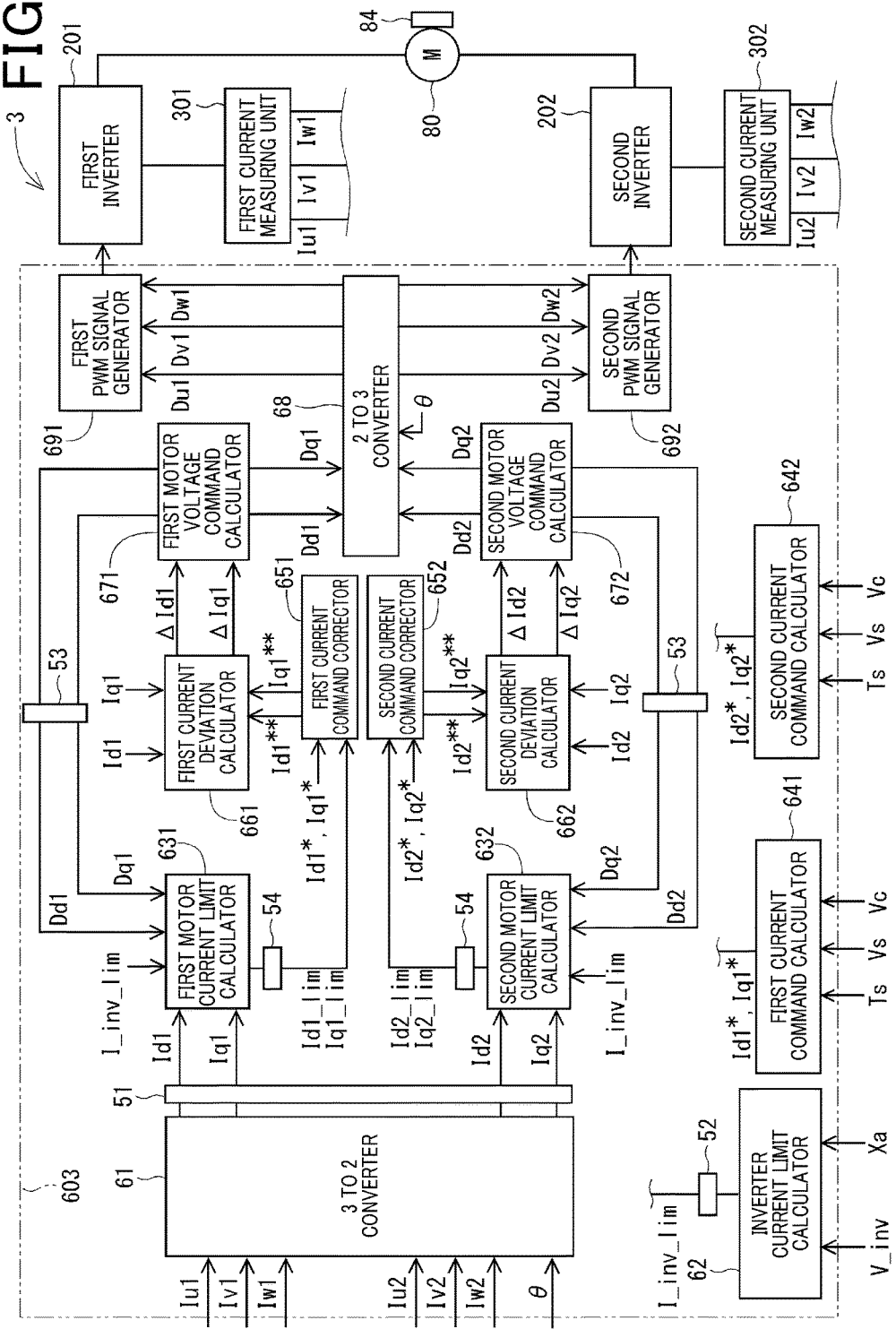
FIG. 10 is a block diagram schematically illustrating functional modules of a control unit according to the second embodiment of the present disclosure.

Next, the following describes an example of the electrical configuration of an electric power steering system 8B according to the third embodiment with reference to FIG. 10. The third embodiment differs from the second embodiment in the following points. So, the following mainly describes the different points, and omits or simplifies descriptions of like parts between the second and third embodiments, to which identical or like reference characters are assigned, thus eliminating redundant description.

The electric power steering system 8B includes the motor 80A and a motor control apparatus 3.

The motor control apparatus 3 includes the power-supply input circuit 10, the power-supply shutoff unit 11, the first inverter 201, the second inverter 202, the first motor-current measuring unit 301, the second motor-current measuring unit 302, the inverter voltage monitor 40, the temperature detector 50, and a control unit 603.

Referring to FIG. 10, the control unit 603 includes the three-phase to two-phase converter 61, the inverter current limit calculator 62, the filters 51 to 54, and the first and second motor current limit calculators 631 and 632. The control unit 603 also includes first and second command current calculators 641 and 642, first and second current command correctors 651 and 652, first and second current deviation calculators 661 and 662, the first and second voltage command calculators 671 and 672, the two-phase to three-phase converter 68, and the first and second PWM signal generators 691 and 692.

The first current command calculator 641 calculates a first d-axis current command id1* and a first q-axis current command iq1* in the d-q coordinate system of the rotor 80b of the motor 80A in accordance with the steering torque Ts, the steering speed Vs, and the vehicle speed Vc.

For example, the first current command calculator 641 has a map in data-table format, in mathematical expression format, and/or program format. The map includes information indicative of the relationship among 1. Values of each of the first d-axis current command Id1* and the first q-axis current command Iq1*,
2. Values of the steering torque Ts,
3. Values of the steering speed Vs,
4. Values of the vehicle speed Vc Specifically, the first current command calculator 641 refers to the map, and extracts a value of each of the first d-axis current command Id1* and the first q-axis current command Iq1* corresponding to the input value of each of the steering torque Ts, the input value of the steering speed Vs, and the input value of the vehicle speed Vc.

Then, the first current command calculator 641 outputs the first d-axis current command Id1* and the first q-axis current command Iq1* to the first current command corrector 651.

Similarly, the second current command calculator 642 calculates a second d-axis current command id2* and a second q-axis current command iq2* in the d-q coordinate system of the rotor 80b of the motor 80A in accordance with the steering torque Ts, the steering speed Vs, and the vehicle speed Vc.

For example, the second current command calculator 642 has a map in data-table format, in mathematical expression format, and/or program format. The map includes information indicative of the relationship among 1. Values of each of the second d-axis current command Id2* and the second q-axis current command Iq2*,
2. Values of the steering torque Ts,
3. Values of the steering speed Vs,
4. Values of the vehicle speed Vc Specifically, the second current command calculator 642 refers to the map, and extracts a value of each of the second d-axis current command Id2* and the second q-axis current command Iq2* corresponding to the input value of each of the steering torque Ts, the input value of the steering speed Vs, and the input value of the vehicle speed Vc.

Then, the second current command calculator 642 outputs the second d-axis current command Id2* and the second q-axis current command Iq2* to the second current command corrector 652.

The first current command corrector 651 corresponds to the first motor current limit calculator 631, the first current command calculator 641, and the first current deviation calculator 661. Similarly, the second current command corrector 652 corresponds to the second motor current limit calculator 632, the second current command calculator 642, and the second current deviation calculator 662.

The first current command corrector 651 receives the first d-axis motor current limit Id1_lim calculated by the first motor current limit calculator 631, and the first q-axis motor current limit Iq1_lim calculated by the first motor current limit calculator 631. Then, the first current command corrector 651 corrects the first d-axis current command id1* and first q-axis current command iq1* in accordance with the respective first d-axis motor current limit Id1_lim and the first q-axis motor current limit Iq1_lim to correspondingly obtain a corrected first d-axis current command id1 and a corrected first q-axis current command iq1. Thereafter, the first current command corrector 651 outputs the corrected first d-axis current command id1 and corrected first q-axis current command iq1 to the first current deviation calculator 661.

Similarly, the second current command corrector 652 receives the second d-axis motor current limit Id2_lim calculated by the second motor current limit calculator 632, and the second q-axis motor current limit Iq2_lim calculated by the second motor current limit calculator 632. Then, the second current command corrector 652 corrects the second d-axis current command id2* and second q-axis current command iq2* in accordance with the respective second d-axis motor current limit Id2_lim and the second q-axis motor current limit Iq2_lim to correspondingly obtain a corrected second d-axis current command id2 and a corrected second q-axis current command iq2. Thereafter, the second current command corrector 652 outputs the corrected second d-axis current command id2 and corrected second q-axis current command iq2 to the second current deviation calculator 662.

The first current deviation calculator 661 subtracts the first d-axis motor current Id1 from the corrected first d-axis current command Id1 to thereby calculate a first d-axis current deviation ΔId1. In addition, the first current deviation calculator 661 subtracts the first q-axis motor current Iq1 from the corrected first q-axis current command Iq1 to thereby calculate a first q-axis current deviation ΔIq1. Then, the first current deviation calculator 661 outputs the first d-axis current deviation ΔId1 and the first q-axis current deviation ΔIq1 to the first voltage command calculator 671.

Similarly, the second current deviation calculator 662 subtracts the second d-axis motor current Id2 from the corrected second d-axis current command Id2 to thereby calculate a second d-axis current deviation ΔId2. In addition, the second current deviation calculator 662 subtracts the second q-axis motor current Iq2 from the corrected second q-axis current command Iq2 to thereby calculate a second q-axis current deviation ΔIq2. Then, the second current deviation calculator 662 outputs the second d-axis current deviation ΔId2 and the second q-axis current deviation ΔIq2 to the second voltage command calculator 672.

The first voltage command calculator 671 performs the known proportional feedback operation or the known proportional-integral feedback operation using the first d-axis current deviation ΔId1 and the first q-axis current deviation ΔIq1 as input data to correspondingly calculate a first d-axis motor voltage duty Dd1 and a first q-axis motor voltage duty Dq1 in the same manner as the voltage command calculator 67. Each of the d- and q-axis motor voltage duties Dd1 and Dq1 causes the corresponding one of the first d- and q-axis current deviations ΔId1 and ΔIq1 to converge to zero. Then, the first voltage command calculator 671 outputs the d-axis motor voltage duty Dd1 and the q-axis motor voltage duty Dq1 to both the first motor current limit calculator 631 via the third filter 53 and the two-phase to three-phase converter 68.

Similarly, the second voltage command calculator 672 performs the known proportional feedback operation or the known proportional-integral feedback operation using the second d-axis current deviation ΔId2 and the second q-axis current deviation ΔIq2 as input data to correspondingly calculate a second d-axis motor voltage duty Dd2 and a second q-axis motor voltage duty Dq2 in the same manner as the voltage command calculator 67. Each of the d- and q-axis motor voltage duties Dd2 and Dq2 causes the corresponding one of the second d- and q-axis current deviations ΔId2 and ΔIq2 to converge to zero. Then, the second voltage command calculator 672 outputs the d-axis motor voltage duty Dd2 and the q-axis motor voltage duty Dq2 to both the second motor current limit calculator 632 via the third filter 53 and the two-phase to three-phase converter 68.

The two-phase to three-phase converter 68 receives the first d-axis motor voltage duty Dd1, the first q-axis motor voltage duty Dq1, the second d-axis motor voltage duty Dd2, the second q-axis motor voltage duty Dq2, and the rotational angle θ.

Then, the two-phase to three-phase converter 68 converts the first d-axis motor voltage duty Dd1 and the first q-axis motor voltage duty Dq1 into first three-phase motor voltage duty commands Du1, Dv1, and Dw1 using the rotational angle θ and, for example, the map data or equation data. Similarly, the two-phase to three-phase converter 68 converts the second d-axis motor voltage duty Dd2 and the second q-axis motor voltage duty Dq2 into second three-phase motor voltage duty commands Du2, Dv2, and Dw2 using the rotational angle θ and, for example, the map data or equation data.

Thereafter, the two-phase to three-phase converter 68 outputs the first three-phase motor voltage duty commands Du1, Dv1, and Dw1 to the first PWM converter 691, and outputs the second three-phase motor voltage duty commands Du2, Dv2, and Dw2 to the second PWM converter 692.

The first PWM signal generator 691 calculates, based on the first motor voltage duty commands Du1, Dv1, and Dw1, first three-phase sinusoidal voltage commands Vu1*, Vv1*, and Vw1*. Then, the first PWM signal generator 691 generates, based on the first three-phase sinusoidal voltage commands Vu1*, Vv1*, and Vw1*, first drive signals for the respective switching elements 21, 24, 22, 25, 23, and 26 of the first inverter 201. Thereafter, the first PWM signal generator 691 applies the first drive signals to the respective switching elements 21, 24, 22, 25, 23, and 26 of the first inverter 201 to correspondingly perform on-off switching operations of the respective switching elements 21, 24, 22, 25, 23, and 26 of the first inverter 201.

Similarly, the second. PWM signal generator 692 calculates, based on the second motor voltage duty commands Du2, Dv2, and Dw2, second three-phase sinusoidal voltage commands Vu2*, Vv2*, and Vw2*. Then, the second. PWM signal generator 692 generates, based on the second three-phase sinusoidal voltage commands Vu2*, Vv2*, and Vw2*, second drive signals for the respective switching elements 21, 24, 22, 25, 23, and 26 of the second inverter 202. Thereafter, the second PWM signal generator 692 applies the second drive signals to the respective switching elements 21, 24, 22, 25, 23, and 26 of the second inverter 202 to correspondingly perform on-off switching operations of the respective switching elements 21, 24, 22, 25, 23, and 26 of the second inverter 202.

As described above, the control unit 603 according to the third embodiment is configured to 1. Calculate the first d- and q-axis motor voltage duties Dd1 and Dq1 such that the calculated first d- and q-axis motor voltage duties Dd1 and Dq1 depend on the inverter voltage V_inv and the first d- and q-axis motor currents Id1 and Iq1.

2. Calculate the second d- and q-axis motor voltage duties Dd2 and Dq2 such that the calculated second d- and q-axis motor voltage duties Dd2 and DV depend on the inverter voltage V_inv and the second d- and q-axis motor currents Id2 and Iq2

This therefore results in

1. The calculated first d- and q-axis motor voltage duties Dd1 and Dq1 depending on a change in the interconnection resistance 70, in the torque constant, and/or in the back-emf constant 2. The calculated second d- and q-axis motor voltage duties Dd2 and Dq2 depending on a change in the interconnection resistance 70, in the torque constant, and/or in the back-emf constant Therefore, calculating the first d- and q-axis inverter current limits Id1_inv_lim and Iq1_inv_lim in accordance with the respective first d- and q-axis motor voltage duties Dd1 and Dq1 and calculating the second d- and q-axis inverter current limits Id2_inv_lim and Iq2_inv_lim in accordance with the respective second d- and q-axis motor voltage duties Dd2 and Dq2 enables 1. The first d- and q-axis inverter current limits Id1_inv_lim and Iq1_inv_lim to be determined depending on a change in the interconnection resistance 70, in the torque constant, and/or in the back-emf constant 2. The second d- and q-axis inverter current limits Id2_inv_lim and Iq2_inv_lim to be determined depending on a change in the interconnection resistance 70, in the torque constant, and/or in the back-emf constant This therefore achieves the advantageous effects, which are similar to those achieved by the first embodiment.

Modifications

The present disclosure is not limited to the above described embodiments, and can be variably modified within the scope of the present disclosure.

Figure 11:
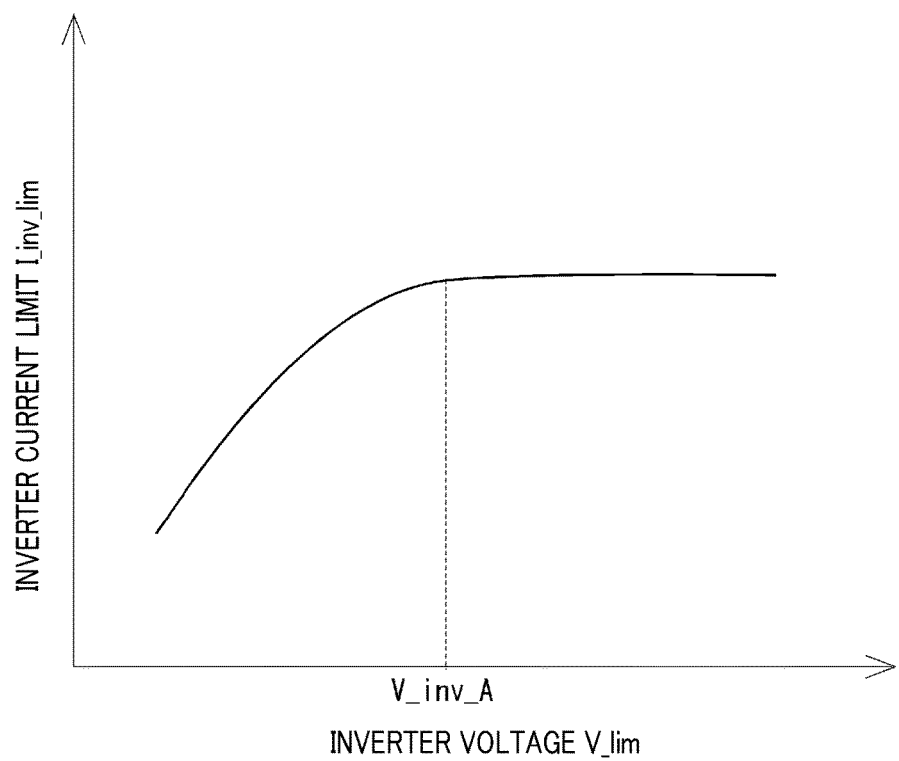
FIG. 11 is a graph schematically illustrating another example of the relationship between the inverter current limit and the inverter voltage according to a modification of the first embodiment.

The inverter current limit calculator 62 for example sets the inverter current limit I_inv_lim such that the inverter current limit I_inv_lim increases with an increase of the inverter voltage V_inv as illustrated in FIG. 4. However, the present disclosure is not limited to the setting. Specifically, as illustrated in FIG. 11, the inverter current limit calculator 62 can set the inverter current limit I_inv_lim such that 1. The inverter current limit I_inv_lim increases with an increase of the inverter voltage V_inv my upon the inverter voltage V_inv being equal to or less than a predetermined voltage V_inv_A 2. The inverter current limit I_inv_lim is kept substantially constant upon. the inverter voltage V_inv being more than the predetermined voltage V_inv_A Each of the motor control apparatuses 1, 2, and 3 according to the corresponding first, second, and third embodiments is configured to 1. Convert three-phase currents to d- and q-axis currents 2. Obtain d- and q-axis motor voltage duties in accordance with the d- and q-axis currents, and d- and q-axis current commands 3. Convert the d- and q-axis motor voltage duties into three-phase motor voltage duties The present disclosure is however not limited to the configuration.

Specifically, each of the motor control apparatuses 1, 2, and 3 can be configured to obtain three-phase motor voltage duties in accordance with the three-phase motor currents and three-phase current commands.

Each of the motor control apparatuses 2 and 3 according to the corresponding second and third embodiments can be configured to control a motor including N sets of three-phase coils; N is an integer equal to or more than three. In this modification, the motor control apparatus 2 can include 1. First to N-th current limit calculators for calculating first d and q-axis current limits to N-th d and q-axis current limits 2. First to N-th voltage command calculators for calculating first d and q-axis motor voltage duties to N-th d and q-axis motor voltage duties 3. First to N-th PWM signal generators 691 and 692 for generating first to N-th drive signals In this modification, the motor control apparatus 3 can include 1. First to N-th current limit calculators for calculating first d and q-axis current limits to N-th d and q-axis current limits 2. First to N-th current command correctors for calculating corrected first d- and q-axis current commands to corrected N-th d- and q-axis current commands 3. First to N-th current deviation calculators for calculating first d-and q-axis current deviation to N-th d- and q-axis current deviations 4. First to N-th voltage command calculators for calculating first d and q-axis motor voltage duties to N-th d and q-axis motor voltage duties 5. First to N-th PWM signal generators 691 and 692 for generating first to N-th drive signals While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus for controlling a motor, the apparatus comprising:
a power converter configured to convert input power from a power supply to output power, and apply the output power to the motor;
a motor current detector configured to detect, as a motor current, a current flowing in the motor;
a converter current limit calculator configured to calculate a converter current limit to which a current flowing in the power converter is to be limited, the current flowing in the power converter being referred to as a converter current;
a motor current limit calculator configured to calculate a motor-current limit to which the motor current is to be limited;
a motor current command calculator configured to calculate a motor current command representing a target value for the motor current;
a current command corrector configured to correct the motor current command as a function of the motor-current limit; and
a motor voltage command calculator configured to calculate a motor voltage command as a function of the corrected motor current command and the motor current, and feed back the motor voltage command to the motor current limit calculator, the motor voltage command representing a target value for a voltage of the output power applied to the motor,
the motor current limit calculator being configured to calculate the motor current limit in accordance with the motor current, the converter current limit, and the motor voltage command fed back from the motor voltage command calculator.

2. The apparatus according to claim 1, further comprising:
a filter configured to eliminate predetermined frequency components included in at least one of the motor current, the converter current limit, the motor voltage command, and the motor current limit.

3. The apparatus according to claim 1, wherein:
the motor is a three-phase alternating-current motor, so that the motor current comprises three-phase motor currents, the apparatus further comprising:
a three-phase to two-phase converter configured to convert the three-phase motor currents to d- and q-axis motor currents in respective d- and q-axes of a d- and q-axis coordinate system defined in the motor as two-phase motor currents, and wherein:
the motor voltage command calculator is configured to calculate, as the motor voltage command, a d-axis voltage command in the d-axis and a q-axis voltage command in the q-axis; and
the motor current limit calculator is configured to calculate, as the motor current limit, a q-axis motor current limit in the q-axis to which the q-axis motor current is limited to satisfy the following equations (I), (II), and (III):

$$\text{Iq\_lim} = \left( \text{I\_inv\_lim} - \frac{Dd \times Id}{Kd} \times \frac{Kq}{Dq} \right) \quad \text{(I)}$$

$$Dd \times Kd \times V\_inv = Vd \quad \text{(II)}$$

$$Dq \times Kq \times V\_inv = Vq \quad \text{(III)}$$

Where Iq_lim represents the q-axis motor current limit;
I_inv_lim represents the converter current limit;
Dd represents the d-axis voltage command;
Dq represents the q-axis voltage command;
Id represents the d-axis motor current;
Kd represents a constant;
Kq represents a constant;
V_inv represents a voltage of the input power to the power converter;
Vd represents a d-axis voltage of the output power of the power converter in the d-axis; and
Vq represents a q-axis voltage of the output power of the power converter in the q-axis.

4. The apparatus according to claim 1, wherein:
the motor is a three-phase alternating-current motor, so that the motor current comprises three-phase motor currents, the apparatus further comprising:
a three-phase to two-phase converter configured to convert the three-phase motor currents to d- and q-axis motor currents in respective d- and q-axes of a d- and q-axis coordinate system defined in the motor as two-phase motor currents, and wherein:
the motor voltage command calculator is configured to calculate, as the motor voltage command, a d-axis voltage command in the d-axis and a q-axis voltage command in the q-axis; and
the motor current it calculator is configured to calculate, as the motor current limit, a d-axis motor current limit in the d-axis to which the d-axis motor current is limited to satisfy the following equations (IV), (V), and (VI):

$$\text{Id\_lim} = \left( \text{I\_inv\_lim} - \frac{Dq \times Iq}{Kq} \times \frac{Kd}{Dd} \right) \quad \text{(IV)}$$

$$Dd \times Kd \times V\_inv = Vd \quad \text{(V)}$$

$$Dq \times Kq \times V\_inv = Vq \quad \text{(VI)}$$

Where Id_lim represents the d-axis motor current limit;
I_inv_lim represents the converter current limit;
Dd represents the d-axis voltage command;
Dq represents the q-axis voltage command;
Iq represents the q-axis motor current;
Kd represents a constant;
Kq represents a constant;
V_inv represents a voltage of the input power to the power converter;
Vd represents a d-axis voltage of the output power of the power converter in the d-axis; and
Vq represents a q-axis voltage of the output power of the power converter in the q-axis.

5. The apparatus according to claim 1, wherein:
the motor current detector comprises at least first and second motor current detectors, the first motor current detector being configured to detect, as the motor current, a first motor current flowing in the motor, the second motor current detector being configured to detect, as the motor current, a second motor current flowing in the motor; and
the motor current limit calculator comprises at least first and second motor current limit calculators, the first motor current limit calculator being configured to calculate, as the motor current limit, a first motor current limit to which the first motor current is limited, the second motor current limit calculator being configured to calculate, as the motor current limit, a second motor current limit to which the second motor current is limited, further comprising:
a motor current limit adder configured to add the first motor current limit and the second motor current limit to correspondingly calculate a motor current limit sum,
the current command corrector being configured to correct the motor current command in accordance with the motor current limit sum as the motor current limit.

6. The apparatus according to claim 1, wherein:
the motor current detector comprises at least first and second motor current detectors, the first motor current detector being configured to detect, as the motor current, a first motor current flowing in the motor, the second motor current detector being configured to detect, as the motor current, a second motor current flowing in the motor;
the motor current limit calculator comprises at least first and second motor current limit calculators, the first motor current limit calculator being configured to calculate, as the motor current limit, a first motor current limit to which the first motor current is limited, the second motor current limit calculator being configured to calculate, as the motor current limit, a second motor current limit to which the second motor current is limited;
the motor current command calculator comprises at least first and second motor current command calculators, the first motor current command calculator being configured to calculate, as the motor current command, a first motor current command representing a first target value for the first motor current, the second motor current command calculator being configured to calculate, as the motor current command, a second motor current command representing a second target value for the second motor current; and
the current command calculator comprises at least first and second current command correctors, the first current command calculator being configured to correct the first motor current command as the motor current command in accordance with the first motor current limit as the motor current limit, the second current command calculator being configured to correct the second motor current command as the motor current command in accordance with the second motor current limit as the motor current limit.

7. The apparatus according to claim 1, further comprising:
a voltage monitor configured to monitor the voltage of the input power to the power converter as a converter voltage, wherein:
the converter current limit calculator is configured to calculate the converter current limit in accordance with the monitored converter voltage.

8. The apparatus according to claim 1, further comprising:
a temperature detector configured to detect an ambient temperature of the power converter, wherein:
the converter current limit calculator is configured to calculate the converter current limit in accordance with the detected ambient temperature.

9. An electric power steering system comprising:
a motor configured to output assist torque for assisting a driver's turning operation of a steering member of a vehicle; and
an apparatus for controlling the motor according to claim 1.

* * * * *